(12) United States Patent
Grier et al.

(10) Patent No.: US 7,109,473 B2
(45) Date of Patent: Sep. 19, 2006

(54) TRANSVERSE OPTICAL ACCELERATOR AND GENERALIZED OPTICAL VORTICES

(75) Inventors: David G. Grier, Chicago, IL (US); Jennifer E. Curtis, Chicago, IL (US)

(73) Assignee: University of Chicago, Chicago, IL (US)

( * ) Notice: Subject to any disclaimer, the term of this patent is extended or adjusted under 35 U.S.C. 154(b) by 127 days.

(21) Appl. No.: 10/659,153

(22) Filed: Sep. 10, 2003

(65) Prior Publication Data

US 2005/0017161 A1 Jan. 27, 2005

Related U.S. Application Data

(60) Provisional application No. 60/451,886, filed on Mar. 4, 2003, provisional application No. 60/411,132, filed on Sep. 16, 2002.

(51) Int. Cl.
*H01S 1/00* (2006.01)

(52) U.S. Cl. ............ 250/251; 250/231.11; 250/227.11; 73/514.19; 359/642; 350/1.1

(58) Field of Classification Search ...................... None
See application file for complete search history.

(56) References Cited

U.S. PATENT DOCUMENTS

| | | | |
|---|---|---|---|
| 4,893,886 A * | 1/1990 | Ashkin et al. ............... | 359/350 |
| 6,815,664 B1 | 11/2004 | Wang et al. | |
| 6,867,411 B1 * | 3/2005 | Kelleher et al. ........ | 250/231.11 |
| 2002/0109923 A1 * | 8/2002 | Matsui et al. ................ | 359/642 |
| 2003/0007894 A1 | 1/2003 | Wang et al. | |
| 2005/0094232 A1 | 5/2005 | Kibar | |
| 2005/0164372 A1 | 7/2005 | Kibar | |

FOREIGN PATENT DOCUMENTS

EP 0307940 3/1989

OTHER PUBLICATIONS

Kreminskaya, L. V. et al., "The Gaussian Lenses Give Birth to Optical Vortices in Laser Beams", Optics Communications,Elsevier, Netherlands, vol. 145, No. 1-6, Jan. 1, 1988, pp. 377-384.
Heckenberg, N. R. et al., "Trapping Microscopic Particles with the Singular Beams", Proceedings of the SPIE—The International Society for Optical Engineering, vol. 3487, 1998, pp. 46-53.
Khizhnyak,A. I. et al., "Optical Singularity's Are Induced in Gaussian Laser Beams by Kerr-like Medium: Geometrical Optics Study", Proceedings of the SPIE—The International Society for Optical Engineering, vol. 3486, 1998, pp. 63-67.
Rodrigo, Peter John et al., "Shack-Hartmann Multiple-Beam Optical Tweezers", Optics Express, vol. 11, No. 3.

* cited by examiner

*Primary Examiner*—Nikita Wells
*Assistant Examiner*—Zia Re. Hashmi.
(74) *Attorney, Agent, or Firm*—Foley & Lardner LLP

(57) ABSTRACT

A method and system for generating modulated optical vortices. Optical vortices can be used for a variety of applications, such as applying controlled torque or controlled force patterns to objects from a few nanometers to hundreds of micrometers in size. Numerous optical modes of optical vortices can be created to meet virtually any desired need in manipulating of objects. Furthermore, one can modify the wavefront of a beam of light in a specific way to create a new type of optical trap useful for manipulating mesoscopic materials. When the modified beam is brought to a focus, the resulting optical trap exerts forces transverse to the optical axis that can be used to transport mesoscopic matter such as nanoclusters, colloidal particles, and biological cells.

20 Claims, 21 Drawing Sheets

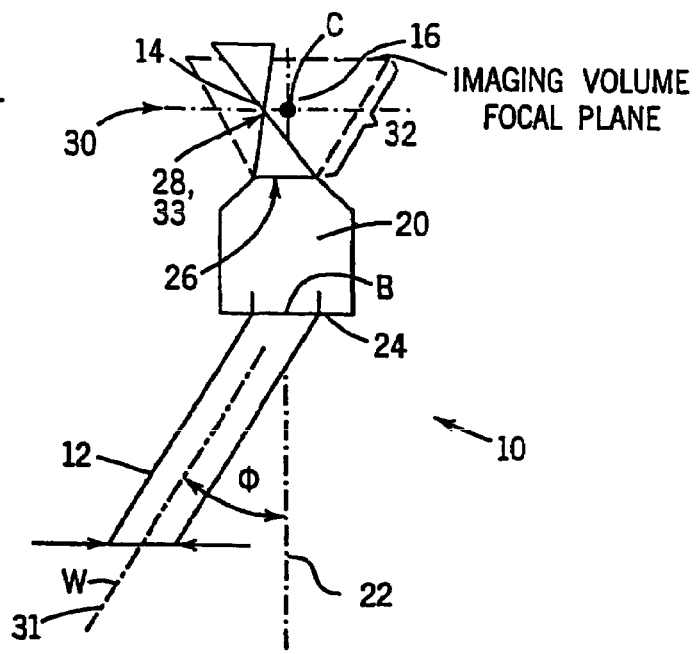
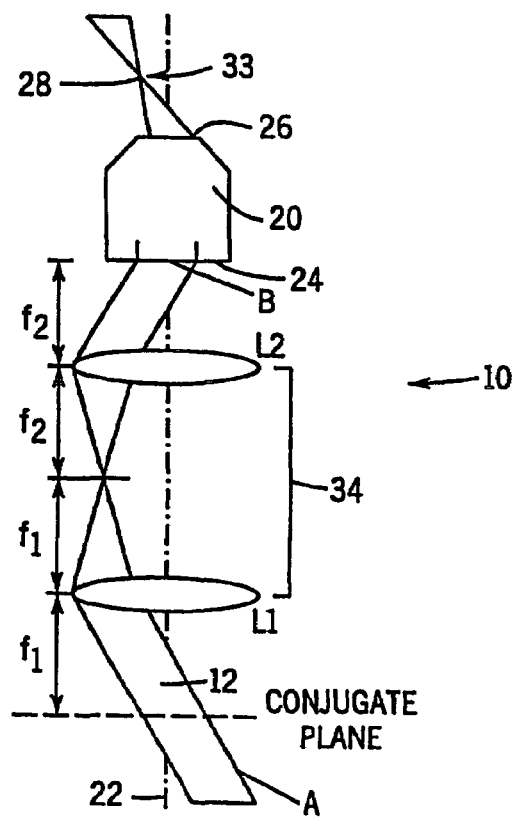

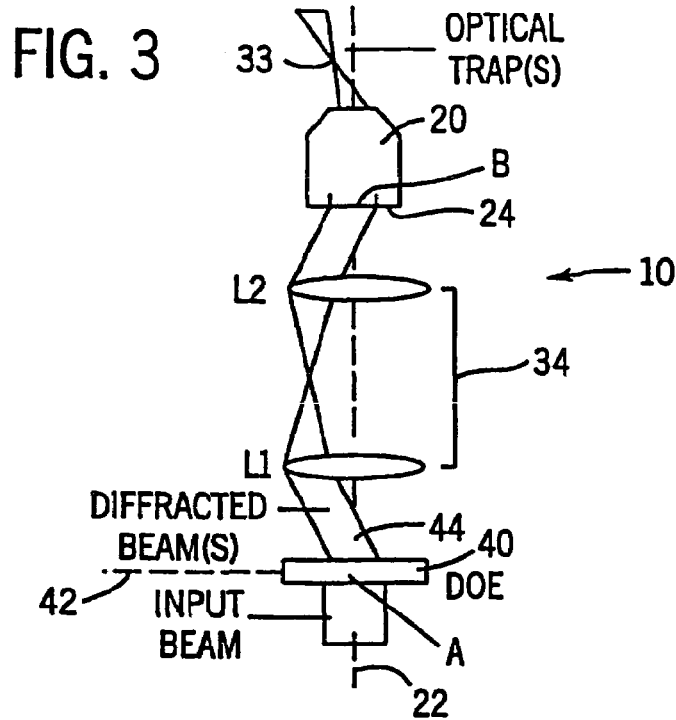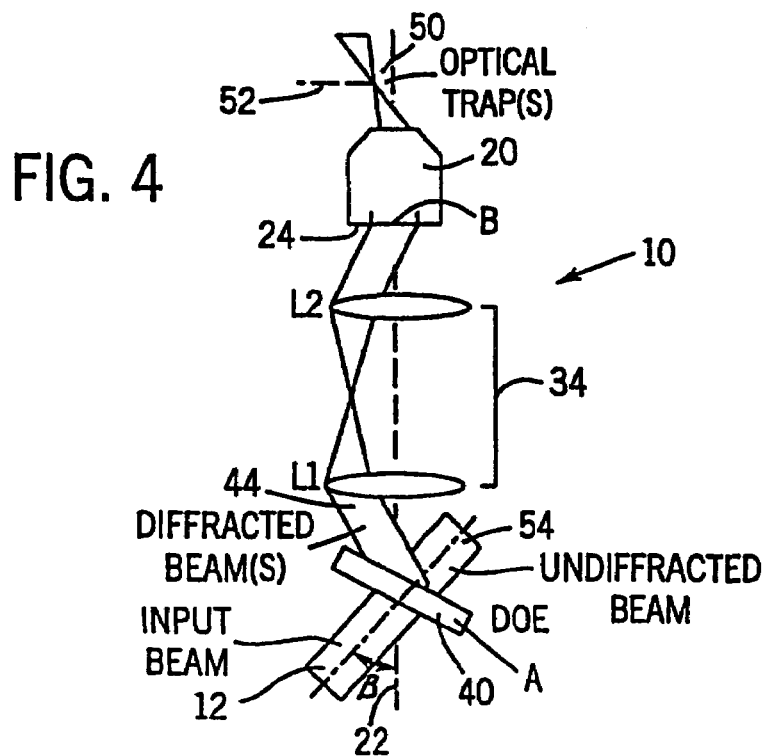

FIG. 10(b)
phase mask
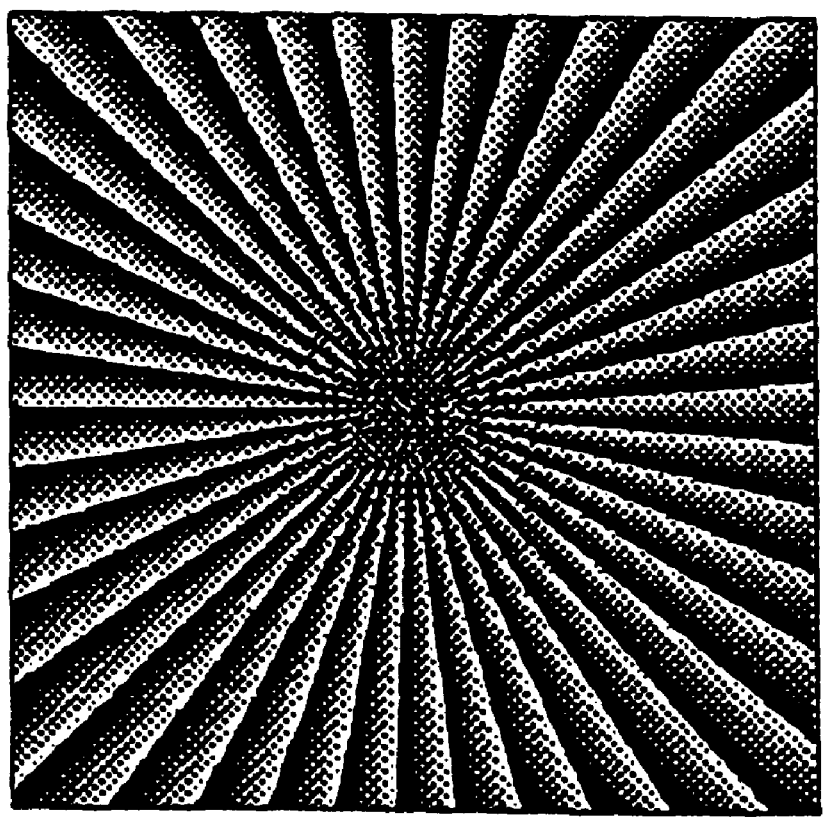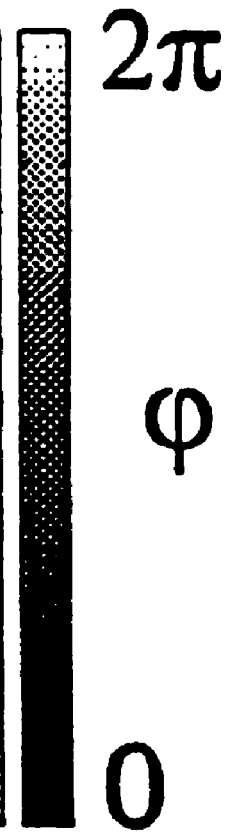

FIG. 14(a)
m=2
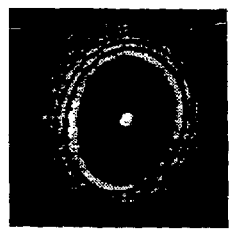
FIG. 14(b)
m=3
FIG. 14(c)
m=4
FIG. 14(d)
m=5
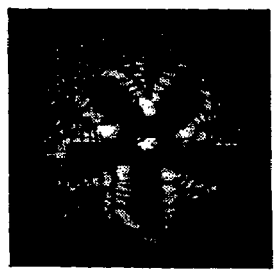
FIG. 14(e)
m=6
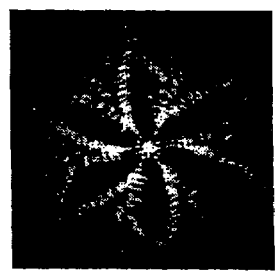
m=7
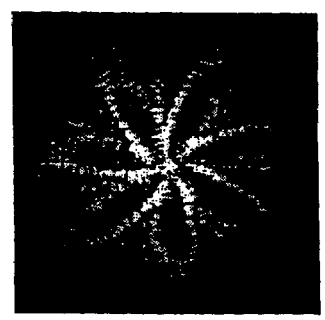
FIG. 14(f)
m=8
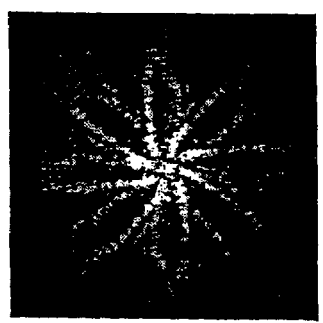
m=9
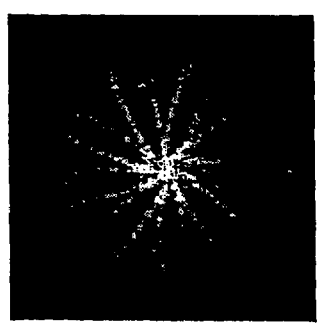
m=10
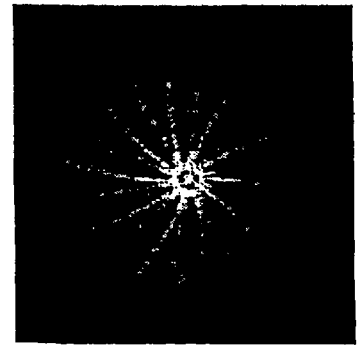
FIG. 14 (g)  FIG. 14(h)  FIG. 14(i)

FIG. 15(a)
α = 0.1
FIG. 15(b)
α = 0.3
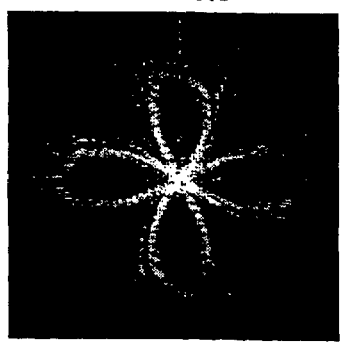
FIG. 15(c)
α = 0.5
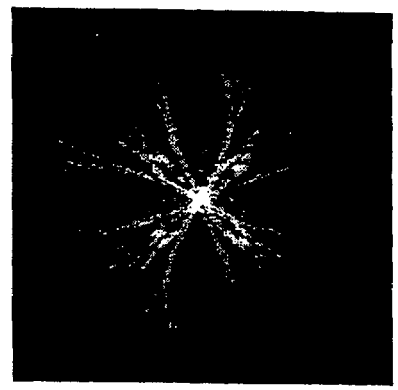
α = 0.7
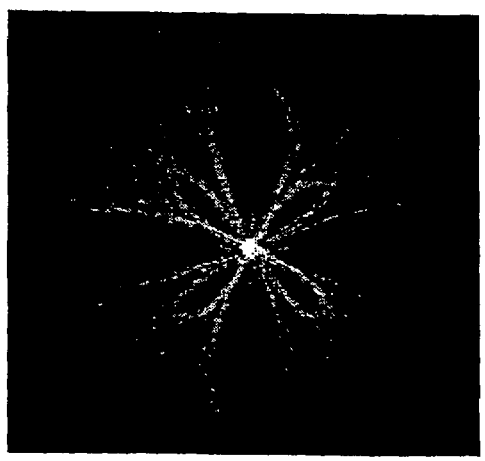
FIG 15(d)
α = 0.9
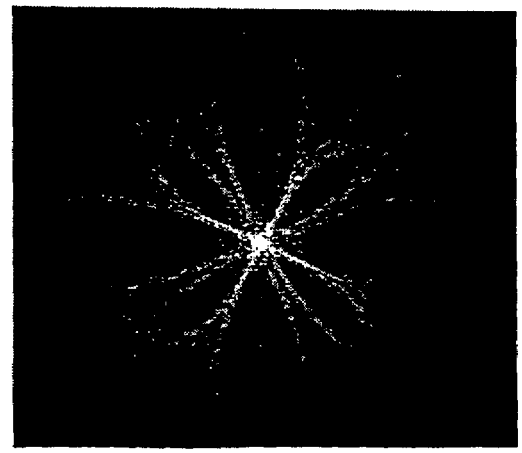
FIG. 15(e)

FIG. 17(b)  (c)  (d)

FIG. 21
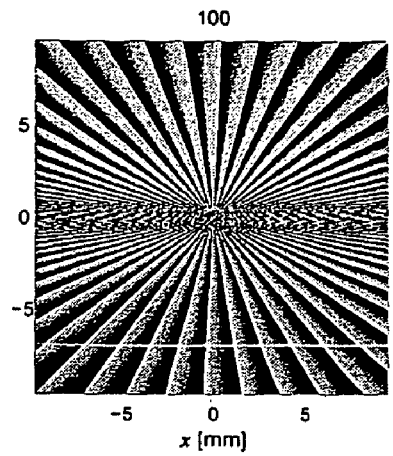
FIG. 22
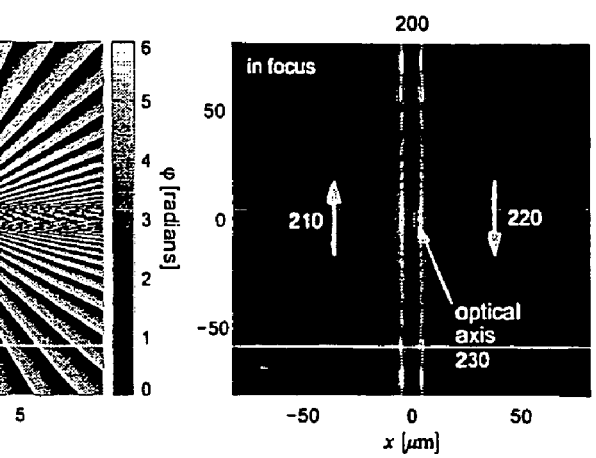
FIG. 23
FIG. 24
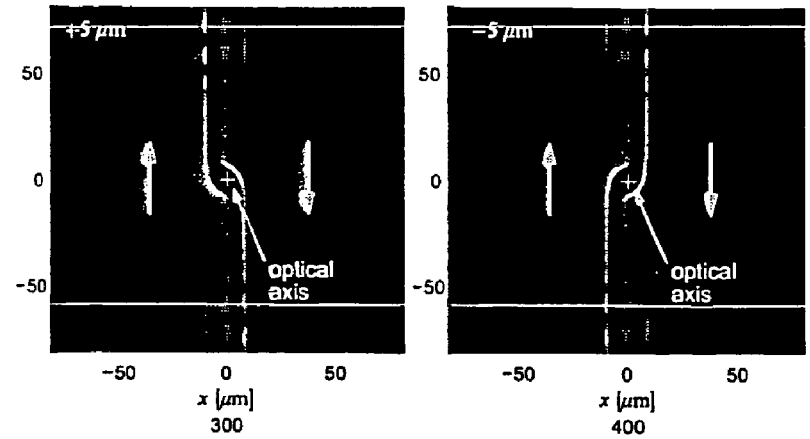

US 7,109,473 B2

TRANSVERSE OPTICAL ACCELERATOR AND GENERALIZED OPTICAL VORTICES

The present application claims priority to U.S. Provisional Application Nos. 60/451,886, filed Mar. 4, 2003, and 60/411,132, filed Sep. 16, 2002.

This invention was made with U.S. Government support under Contract No. UCHI-982/994 awarded by the National Science Foundation under Award No. DMR-9880595 and also National Science Foundation Grant under Award No. DMR-9730189.

FIELD OF THE INVENTION

The present invention relates to optical traps or tweezers for control of matter, particularly optical traps that apply controlled forces to matter along an extended path transverse to the optical axis. The present invention also relates generally to a method and apparatus for creation and use of optical vortices and, more particularly, to using one of a variety of phase masks to establish a selected optical vortex to apply a precise form of controlled torque to objects for commercial uses and applications.

BACKGROUND OF THE INVENTION

It is conventionally known that holographic optical traps may be used for manipulating small objects dispersed in fluid. For example, material transport can result from a process resembling peristaltic pumping, with a sequence of holographically-defined manifolds of traps resembling the states of a physical peristaltic pump. In all such conventional approaches, transport transverse to the optical axis cannot be accomplished by a single optical intensity pattern, but rather requires three or more separate patterns of optical traps to be projected. Other approaches based on generalized optical traps (commonly known as optical vortices) trap small objects on rings of light transverse to the optical axis and drive them in circular orbits around these rings. The resulting motion can be used to drive fluid flow and thus transport other objects in the plane transverse to the optical axis. Such indirect optical driving requires conditions conducive to the operation of optical vortices, sufficiently open geometry and a sufficiently low flow rate.

In order to best understand the improvements of the invention, FIG. 1 illustrates prior art methods and systems which can be used to advantage in the invention features of characterizing and removing optical aberrations. In the prior art optical tweezer system 10 of FIG. 1, optical gradient forces exerted by a single beam of light 12 are used to controllably manipulate a small dielectric particle 14 dispersed in a medium 16 whose index of refraction, $n_m$, is smaller than that of the particle 14 at optical frequencies. The nature of the optical gradient forces is well known, and also it is well understood that the principle has been generalized to allow manipulation of reflecting, absorbing and low dielectric constant particles as well. Any of these techniques can be implemented in the context of the invention described hereinafter and will be encompassed by use of the terminology optical tweezer, optical trap and optical gradient force trap hereinafter.

The optical tweezer system 10 is applied by using a light beam 12 (such as a laser beam) capable of applying the necessary forces needed to carry out the optical trapping effect needed to manipulate a particle. The object of a conventional form of the optical tweezer 10 is to project one or more beams of light into the center of a back aperture 24 of a converging optical element (such as an objective lens 20). As noted in FIG. 1, the light beam 12 has a width, w, and has an input angle φ relative to an optical axis 22. The light beam 12 is input to a back aperture 24 of the objective lens 20 and output from a front aperture 26 substantially converging to a focal point 28 in focal plane 30 of imaging volume 32 with the focal point 28 in near association with an optical trap 33. In general, any focusing optical system can form the basis for the optical tweezer system 10.

In the case of the light beam 12 being a collimated laser beam and having its axis coincident with the optical axis 22, the light beam 12 enters the back aperture 24 of the objective lens 20 and is brought to a focus in the imaging volume 32 at the center point c of the objective lens' focal plane 30. When the axis of the light beam 12 is displaced by the angle φ with respect to the optical axis 22, beam axis 31 and the optical axis 22 coincide at the center point B of the back aperture 12. This displacement enables translation of the optical trap across the field of view by an amount that depends on the angular magnification of the objective lens 20. The two variables, angular displacement φ and varying convergence of the light beam 12, can be used to form the optical trap at selected positions within the imaging volume 32. A plurality of the optical traps 33 can be arranged in different locations provided that multiple beams of light 12 are applied to the back aperture 24 at different angles φ and with differing degrees of collimation.

In order to carry out optical trapping in three dimensions, optical gradient forces created on the particle to be trapped must exceed other radiation pressures arising from light scattering and absorption. In general, this necessitates having the wave front of the light beam 12 to have an appropriate shape at the back aperture 24. For example, for a Gaussian $TEM_{00}$ input laser beam, the beam diameter w should substantially coincide with the diameter of the back aperture 24. For more general beam profiles (such as Laguerre-Gaussian modes) comparable conditions can be formulated.

In another prior art system in FIG. 2, the optical tweezer system 10 can translate the optical trap 33 across the field of view of the objective lens 20. A telescope 34, or other relay optics, is constructed of lenses L1 and L2 which establishes a point A which is optically conjugate to the center point B in the prior art system of FIG. 1. In other forms of the invention the relay optics can include other conventional systems, such as multiple optical elements to minimize aberrations. In the system of FIG. 2 the light beam 12 passing through the point A also passes through the point B and thus meets the basic requirements for performing as the optical tweezer system 10. The degree of collimation is preserved by positioning the lenses L1 and L2 as shown in FIG. 2. The transfer properties of the telescope 34 can be chosen to optimize angular displacement of the light beam 12 and its width w in the plane of the back aperture 24 of the objective lens 20. As stated hereinbefore, in general several of the light beams 12 can be used to form several associated optical traps. Such multiple beams 12 can be created from multiple independent input beams or from a single beam manipulated by conventional reflective and/or refractive optical elements.

In another prior art system shown in FIG. 3, arbitrary arrays of optical traps can be formed. A diffractive optical element 40 is disposed substantially in a plane 42 conjugate to back aperture 24 of the objective lens 20. Note that only a single diffracted output beam 44 is shown for clarity, but it should be understood that a plurality of such beams 44 can be created by the diffractive optical element 40. The input light beam 12 incident on the diffractive optical element 40 is split into a pattern of the output beams 44 characteristic of the nature of the diffractive optical element 40, each of which emanates from the point A. Thus the output beams 44 also pass through the point B as a consequence of the downstream optical elements described hereinbefore.

The prior art diffractive optical element 40 of FIG. 3 is shown as being normal to the input light beam 12, but many other arrangements are possible. For example, in the prior art system of FIG. 4 the light beam 12 arrives at an oblique angle β relative to the optic axis 22 and not at a normal to the diffractive optical element 40. In this embodiment, the diffracted beams 44 emanating from point A will form optical traps 50 in focal plane 52 of the imaging volume 32 (seen best in FIG. 1). In this arrangement of the optical tweezer system 10 an undiffracted portion 54 of the input light beam 12 can be removed from the optical tweezer system 10. This configuration thus enables processing less background light and improves efficiency and effectiveness of forming optical traps.

The diffractive optical element 40 can include computer generated holograms which split the input light beam 12 into a preselected desired pattern. Combining such holograms with the remainder of the optical elements in FIGS. 3 and 4 enables creation of arbitrary arrays in which the diffractive optical element 40 is used to shape the wavefront of each diffracted beam independently. Therefore, the optical traps 50 can be disposed not only in the focal plane 52 to form a three-dimensional arrangement of the optical traps 50.

In the optical tweezer system 10 of FIGS. 3 and 4, also included is a focusing optical element, such as the objective lens 20 (or other like functionally equivalent optical device, such as a Fresnel lens) to converge the diffracted beam 44 to form the optical traps 50. Further, the telescope 34, or other equivalent transfer optics, creates a point A conjugate to the center point B of the previous back aperture 24. The diffractive optical element 40 is placed in a plane containing point A.

In another form of prior art system, arbitrary arrays of the optical traps 50 can be created without use of the telescope 34. In such an embodiment the diffractive optical element 40 can be placed directly in the plane containing point B.

In the optical tweezer system 10, either static or time dependent diffractive optical elements 40 can be used. For a dynamic, or time dependent version, one can create time changing arrays of the optical traps 50 which can be part of a system utilizing such a feature. In addition, these dynamic optical elements 40 can be used to actively move particles and matrix media relative to one another. For example, the diffractive optical element 40 can be a liquid crystal phase modulating array that imprints computer generated holographic patterns onto incident light.

In another prior art system illustrated in FIG. 5, a system can be constructed to carry out continuous translation of the optical tweezer trap 50. A gimbal mounted mirror 60 is placed with its center of rotation at point A. The light beam 12 is incident on the surface of the mirror 60 and has its axis passing through point A and will be projected to the back aperture 24. Tilting of the mirror 60 causes a change of the angle of incidence of the light beam 12 relative to the mirror 60, and this feature can be used to translate the resulting optical trap 50. A second telescope 62 is formed from lenses L3 and L4 which creates a point A' which is conjugate to point A. The diffractive optical element 40 placed at point A' now creates a pattern of diffracted beams 64, each of which passes through point A to form one of the tweezer traps 50 in an array of the optical tweezers system 10.

In operation of the embodiment of FIG. 5, the mirror 60 translates the entire tweezer array as a unit. This methodology is useful for precisely aligning the optical tweezer array with a stationary substrate, for dynamically stiffening the optical trap 50 through small-amplitude rapid oscillatory displacements, as well as for any applications requiring a general translation capability.

The array of the optical traps 50 also can be translated vertically relative to the sample stage (not shown) by moving the sample stage or by adjusting the telescope 34. In addition, the optical tweezer array can also be translated laterally relative to the sample by moving the sample stage. This feature would be particularly useful for large scale movement beyond the range of the objective lens' field of view.

In another prior art system shown in FIG. 6, the optical system is arranged to permit viewing images of particles trapped by the optical tweezers 10. A dichroic beamsplitter 70, or other equivalent optical beamsplitter, is inserted between the objective lens 20 and the optical train of the optical tweezer system 10. In the illustrated embodiment the beamsplitter 70 selectively reflects the wavelength of light used to form the optical tweezer array and transmits other wavelengths. Thus, the light beam 12 used to form the optical traps 50 is transmitted to the back aperture 24 with high efficiency while light beam 66 used to form images can pass through to imaging optics (not shown).

A prior art application of optical traps is shown in FIGS. 7A and 7B. The diffractive optical element 40 is designed to interact with the single light beam 12 to create a 4×4 array of collimated beams. A 100 mW frequency doubled diode-pumped Nd:YAG laser operating at 532 nm provides a Gaussian $TEM_{00}$ form for the light beam 12. In FIG. 7A the field of view is illuminated in part by laser light backscattered by sixteen silica spheres trapped in the array's sixteen primary optical tweezers 10. The 1 μm diameter spheres are dispersed in water and placed in a sample volume between a glass microscope slide and a 170 μm thick glass coverslip. The tweezer array is projected upward through the coverslip and is positioned in a plane 8 μm above the coverslip and more than 20 μm below the upper microscope slide. The silica spheres are stably trapped in three dimensions, each in one of the sixteen optical tweezers 10.

In FIG. 7B is shown the optically-organized arrangement of spheres ⅟30 second after the optical tweezers 10 (traps) were extinguished but before the spheres had time to diffuse away from the trap site.

Consequently, optical tweezers and related optical traps use forces exerted by the intensity gradients in tightly focused beams of light to trap, move and otherwise modify small volumes of matter in three dimensions. Imprecise alignment and imperfect characteristics of the optical elements of an optical trapping system introduce aberrations into the trapping beam, diminish its intensity gradients, and thereby degrade its ability to manipulate matter. In common practice, the optical elements in optical trapping systems are aligned by systematically adjusting each element's position while observing the apparent quality of the focused optical trap using a optical imaging system. A well aligned optical tweezer comes to a tight and symmetric focus and spreads uniformly and symmetrically when defocused. While simple and reasonably effective, this approach does not generally achieve optimal performance, nor does it provide a quantitative assessment of the optical train's alignment.

SUMMARY OF THE INVENTION

The present invention involves modifying the wavefront of a beam of light in a specific way to create a new type of optical trap useful for manipulating mesoscopic materials. When the modified beam is brought to a focus, the resulting optical trap exerts forces transverse to the optical axis that can be used to transport mesoscopic matter such as nanoclusters, colloidal particles, and biological cells. The new type of trap is created from a conventional beam of light such as a laser beam whose wavefronts are at least approximately planar. Focusing such a beam with a lens whose numerical aperture is sufficiently large results in a single-beam gradient-force optical trap known as an optical tweezer. Modifying the phase of the wavefront with a phase modulation $\phi(\vec{r})$ can modify the properties of the focused beam, and therefore the properties of the resulting optical trap. The vector $\vec{r}$ is the position relative to the beam's axis (the optical axis) in a plane transverse to the direction of propagation.

It is an object of the invention to provide an improved method and system for establishing a plurality of aberration free optical traps.

It is another object of the invention to provide a novel method and system for using a method for correcting aberrations in an optical train.

It is an additional object of the invention to provide a novel method and apparatus for using computer software to correct aberrations in an optical train.

It is a further object of the invention to provide an improved method and system for establishing a plurality of substantially aberration free optical traps for a variety of commercial applications relating to manipulation of small particles such as in photonic circuit manufacturing, nanocomposite material applications, fabrication of electronic components, opto-electronic devices, chemical and biological sensor arrays, assembly of holographic data storage matrices, facilitation of combinatorial chemistry applications, promotion of colloidal self-assembly, and the manipulation of biological materials.

It is still another object of the invention to provide an improved method and system for constructing a temporally and spatially varying configuration of optical gradient fields corrected for aberrations to meet various commercial application requirements.

It is also an object of the invention to provide a novel method and system for using an encoded phase shifting pattern applied to a pattern of optical traps for correcting for aberration effects.

It is yet a further object of the invention to provide an improved method and system using a single input laser beam, a diffractive optical element, a converging lens and an encoded aberration correction pattern to form a substantially aberration free static and/or dynamic optical trap.

It is also a further object of the invention to provide an improved method and system employing a laser beam input to a diffractive optical element and further using an aberration correction pattern with a beam scanning system enabling scanning of an array of optical traps for various commercial applications.

It is also yet another object of the invention to provide an improved method and system for employing a light beam, diffractive optics and an aberration correction system in conjunction with a plurality of telescope lenses to scan an optical trap array while maintaining substantially aberration free traps.

It is another object of the invention to provide a novel method for creating multiple independently steered optical traps using a time-dependent addressable phase-shifting medium (such as a liquid crystal phase shifting array) as a diffractive optical element and also to encode an aberration correction pattern with that medium.

It is yet a further object of the invention to provide an improved set of optical vortices and methods of making and using these vortices.

Other objects, features and advantages of the present invention will be readily apparent from the following description of the preferred embodiments thereof, taken in conjunction with the accompanying drawings described below wherein like elements have like numerals throughout.

BRIEF DESCRIPTION OF THE DRAWINGS

FIG. 1 illustrates a prior art method and system for a single optical tweezer;

FIG. 2 illustrates a prior art method and system for a single, steerable optical tweezer;

FIG. 3 illustrates a prior art method and system using a diffractive optical element;

FIG. 4 illustrates another prior art method and system using a tilted optical element relative to an input light beam;

FIG. 10(b) is a phase mask to be applied to system of FIG. 10(a)

FIGS. 14(a)–(i) show the dependence of modulated vortices with l=60, α=0.1 and β≅0 with m changing from m=2 to m=10 in integer steps;

FIGS. 15(a)–(e) show the dependence of a modulated vortex m=4 on the changing amplitude modulation α=0.1, 0.3, 0.5, 0.7 and 0.9, respectively;

FIG. 17(b) shows the phase modulations encoding an l=40 optical vortex.

FIG. 21 is a plot showing the implementation of a transverse optical accelerator, wherein the phase junction is plotted modulo 2π;

FIG. 22 is a plot of the resulting intensity profile in the focal plane of a trap-forming objective lens;

FIG. 23 is a plot showing the intensity pattern from the phase modulation of FIG. 21 imaged in a plane 5 micrometers above the focal plane; and FIG. 24 is a plot showing the intensity pattern from the phase modulation of FIG. 21 imaged in a plane 5 micrometers below the focal plane.

DETAILED DESCRIPTION OF THE PREFERRED EMBODIMENTS

The electric and magnetic fields of a beam of light can be described as a complex-valued function of position:

$$\vec{E}(\vec{r}) = A(\vec{r}) \exp(-i\phi(\vec{r})), \quad (1)$$

where $A(\vec{r})$ is the real-valued amplitude and $\phi(\vec{r})$ is the real-valued phase. The preferred form of the invention involves modifying only the phase, $\phi(\vec{r})$ of an input beam of light.

There are benefits of imprinting a helical phase profile on an input whose wavefronts previously had constant phase, $\phi(\vec{r})=0$. This can be described by, $$\phi_l(\vec{r}) = l\theta, \quad (2)$$

In Eq. (2) the variable θ is the azimuthal angle around the optical axis in a plane transverse to the direction of propagation, and l is an integral winding number known as the topological charge. The resulting helical mode of light focuses to a ring, rather than to a spot. More importantly, the helical beam also carries orbital angular momentum that can be transferred to trapped objects. The resulting trap therefore applies torques and is known as an optical vortex.

The angular momentum flux in an optical vortex takes the form of a transverse component of the beam's linear momentum flux that tends to drive a trapped particle around the optical vortex's circumference. Semiclassical theory demonstrates that each photon in such a beam contributes $l\hbar$ to the total angular momentum flux. The total torque thus depends on the topological charge, l, on the laser beam's power P, and on the radius $R_l$, of the optical vortex, as well as on the illuminated object's optical scattering properties.

Recently, it has been determined that an optical vortex's radius of maximum intensity scales very nearly linearly with topological charge:

$$R_l \approx A \frac{\lambda}{NA}\left(1 + \frac{l}{l_o}\right), \quad (3)$$

where λ is the wavelength of light, NA is the numerical aperture of the focusing element, and where A≈0.4 and $l_o$≈9.8 are numerical constants describing a uniformly bright beam's propagation through the optical train. This linear dependence results from diffraction by the focusing element's necessarily limited aperture. This linear dependence on l leads to scaling predictions for optical vortices' optomechanical properties with which one can probe the nature of the angular momentum carried by helical modes. In particular, a wavelength-scale particle trapped on the circumference of an optical vortex is illuminated with an intensity $I_l \propto P/(2\pi\lambda R_l)$, where P is the power of the input beam. This assumes that the photon flux is spread uniformly around the vortex's circumference in a band roughly λ thick. Assuming that each scattered photon transfers an angular momentum proportional to $l\hbar$, then the particle's tangential speed should be proportional to $1/R_l^2$. The time required to make one circuit of the optical vortex should scale as $$T_l(P) \propto R_l^3/(lP). \tag{4}$$

Figures 16A, 16B:
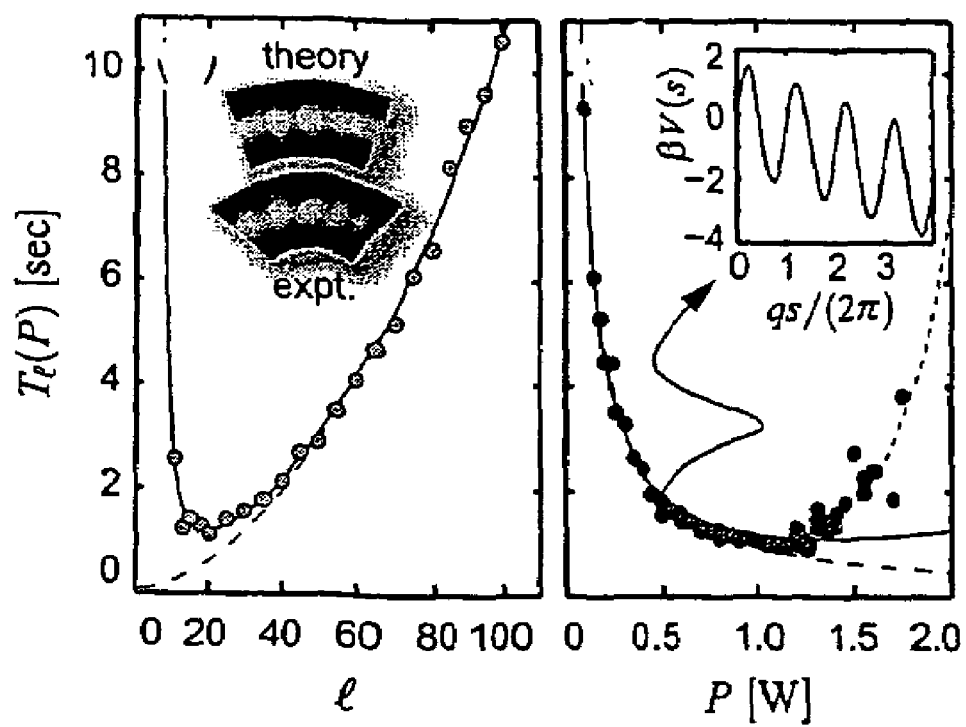
FIG. 16(a) is a representation of the time required for a colloidal sphere to complete one circuit of an optical vortex, with the inset showing the corrugated intensity distribution around one quarter of the circumference of an l=20 optical vortex measured at reduced intensity, compared with calculated pattern at l=40 at the same scale.
FIG. 16(b) is a representation of the dependence of $T_l(P)$ on applied power for l=19, with the inset showing the potential energy landscape calculated from fits to data in FIGS. 16(a) and 16(b) for l=19 and P=500 mW.

The data in FIG. 16(a) show that Tl(P) does indeed scale according to Eqs. (3) and (4) for larger values of l.

For l<40, however, the period is systematically larger than predicted. Similarly, $T_l(P)$ scales with P as predicted for lower powers, but increases as P increases. In other words, the particle moves slower as the particle is pushed harder. Both of these unexpected effects can be ascribed to the detailed structure of optical vortices created with pixellated diffractive optical elements. The mechanism presents new opportunities for utilization of Brownian transport in modulated potentials.

When projected onto the objective lens' input pupil, each effective phase pixel spans roughly 10λ. Numerically transforming such an apodized beam reveals a pattern of 2 l intensity corrugations, as shown in FIG. 16(a). These establish a nearly sinusoidal potential through which the particle can be driven by the local angular momentum flux. The intensity's dependence on arclength s around the ring is modeled as:

$$l_l(s) = \frac{P}{2\pi\lambda R_l}(1 + \alpha \cos qs), \tag{5}$$

where α is the depth of the modulation, an $q=2l/R_l$ is its wave number. For $l>l_0 \approx 10$, q is approximately independent of l.

This modulated intensity exerts two tangential forces on the trapped sphere. One is due to the transferred angular momentum, $$F_l(s) = A_o \frac{P}{R_l}(1 + \alpha \cos qs), \tag{6}$$

where a local angular momentum flux of $l\hbar$ per photon is assumed. The prefactor $A_0$ includes such geometric factors as the particle's scattering cross-section. The other is an optical gradient force due to the polarizable particle's response to local intensity gradients:

$$F_g(s) = -\varepsilon A_0 \frac{2\pi\lambda}{q} \frac{\partial l_l(s)}{\partial s} = \varepsilon A_0 \frac{P}{R_l}\alpha \sin qs, \tag{7}$$

where ε sets the relative strength of the gradient force. Combining Eqs. (6) and (7) yields the tangential force $$F(s) = A_0 \frac{P}{R_l}(1 - \eta \cos qs), \tag{8}$$

where an irrelevant phase angle has been dropped, and where $\eta = \alpha(1+\varepsilon^2)^{1/2}$. Even if α is much smaller than unity, both ε and η can be much larger. In that case, reducing l at fixed power increases the depth of the modulation relative to the thermal energy scale $k_BT$, and the particle can become hung up in the local potential minima. The modulated potential thus increases the effective drag.

A particle's motion along an inclined sinusoidal potential with strong viscous damping is described by the Langevin equation:

$$\gamma \frac{ds}{dt} = F(s) + \Gamma(t), \tag{9}$$

where γ is the viscous drag coefficient and Γ(t) is a zero-mean random thermal force. The associated mobility μ can be expressed as:

$$\gamma\mu = 1 + 2\mathrm{Im}\left\{ \cfrac{\frac{1}{4}\eta^2}{\frac{l}{l_T} + i + \cfrac{\frac{1}{4}\eta^2}{2\frac{l}{l_T} + i + \ldots}} \right\}, \tag{10}$$

where $l_T = A_0 P/(4\pi\eta k_B T)$ is the topological charge at which the modulation reaches $k_BT$. Given this result, the transit time for one cycle should be:

$$T_l(P) = T_1 \frac{P_1}{P} \frac{l^2}{\gamma\mu}, \tag{11}$$

where $T_1 = A_0/(2\pi\gamma R_1 P_1)$ is the expected period for l=1 at $P=P_1$ in the absence of modulation. The solid curve in FIGS. 16(a) and 16(b) is a fit to Eqs. (10) and (11) for $T_1$, $l_T$ and η. The results, $T_1 P_1/P=1$ msec, $l_T$–1.7, and η=19, are consistent with the strongly modulated potential shown in the inset to FIG. 16(b). Rather than smoothly processing around the optical vortex, the particle instead makes thermally activated hops between potential wells in a direction biased by the optical vortex's torque.

Replacing $1/l_T$ with $P_T/P$ in Eq. (10) yields an analogous result for the period's dependence on applied power for fixed l, as shown in FIG. 16(b). Here, $P_T = 4\pi l \eta k_B T/A_0$ is the power at which the modulation reaches $k_BT$. Using η and $P_1 T_1$ obtained from FIG. 16(a), the sphere's motions above P=1.5 W are slower even than the model predicts. The period's divergence at high power is due to a localized "hot spot" on the l=19 optical vortex resulting from aberrations in the optical train. Such hot spots have confounded previous attempts to study single-particle dynamics in helical beams. Because hot spots also deepen with increasing power, they retain particles with exponentially increasing residence times. The total transit time becomes:

$$T(P) = T_l(P) + T_H \exp(P/P_H). \tag{12}$$

The data in FIG. 16(b) are consistent with $T_H$=5 msec and $P_H$=270 mW. Localization in hot spots becomes comparable to corrugation-induced drag only for powers above P=1 W and so does not affect the data in FIG. 16(a). Consequently, these data offer insights into the nature of the helical beam's angular momentum density.

Eq. (3) above has been generalized to account for the possibility that the helical phase profile might not have a uniform pitch. The radius of maximum intensity $R(\theta)$ at a given angle $\theta$ is related to the wavefront's azimuthal phase modulation through:

$$R(\theta) = A\frac{\lambda}{NA}\left[1 + \frac{1}{l_0}\frac{d\varphi(\theta)}{d\theta}\right]. \quad (13)$$

This formula was utilized by modulating the helicity of optical vortices according to:

$$\phi(\theta) = l[\theta + \alpha \sin(m\theta + \beta)]. \quad (14)$$

The resulting modulated optical vortices do indeed have m-fold modulations of the radii whose depth depends on $\alpha$ and whose orientation depends on $\beta$. Studying the motion of micrometer-scale colloidal particles trapped on modulated optical vortices confirms that these still exert forces tangent to the periphery, $R(\theta)$.

Figure 17A:
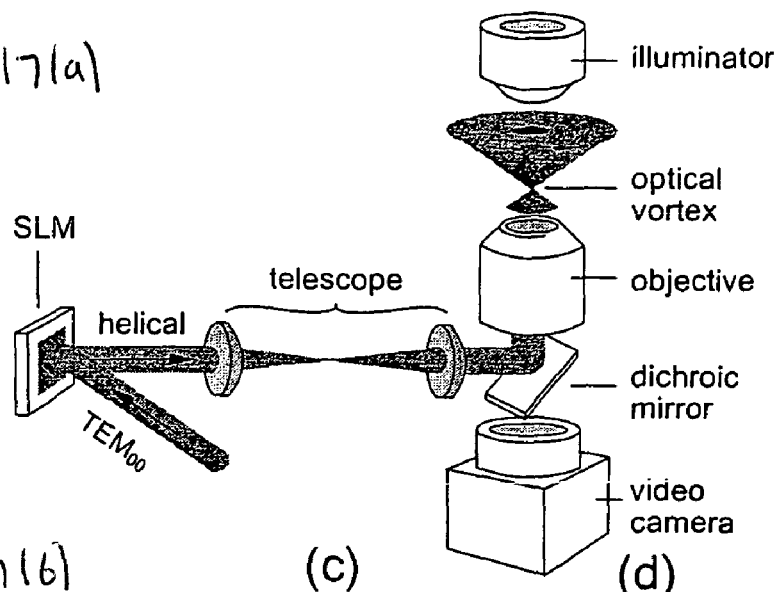
FIG. 17(a) is a schematic diagram of a reflective spatial light modulator that imprints the phase modulation $\phi(\vec{r})$ onto the wavefront of a TEM$_{00}$ laser beam, wherein the transformed beam is relayed by a telescope to the back aperture of a microscope objective lens that focuses it into an optical trap and a conventional illuminator and video camera create images of objects in the trap.
Figures 17C, 17D:
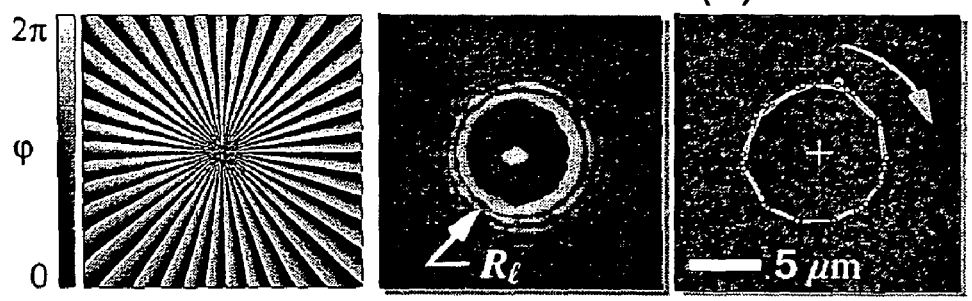
FIG. 17(c) shows the resulting optical vortex's intensity in the focal plane.
FIG. 17(d) shows the trajectory of a single 800 nm diameter silica sphere traveling around the optical vortex's circumference, measured at 1/6 second intervals over 5 seconds.

In one optical trapping system, shown in FIG. 17(*a*), a reflective liquid crystal spatial light modulator (SLM) is used to imprint a desired phase profile $\phi(r)$ onto the wavefront of a collimated $TEM_{00}$ beam of light ($\lambda$=532 nm). The modified beam is relayed to the input pupil of a high-NA objective lens mounted in an inverted light microscope. A mirror placed in the lens' focal plane reflects the resulting intensity distribution back down the optical axis to form an image on an attached video camera. FIG. 17(*b*) shows a typical phase mask encoding an optical vortex with, l=40, and FIG. 17(*c*) shows the resulting intensity distribution. The SLM has a diffraction of roughly 50%, and the central spot in FIG. 17(*c*) is a conventional optical tweezer centered on the optical axis formed from the undiffracted portion of the input beam. Because the SLM can only impose phase shifts in the range 0 to $2\pi$ radians, the projected phase function wraps around at $\phi=2\pi$ to create a scalloped appearance.

When an optical vortex is projected into a sample of colloidal microspheres dispersed in water, optical gradient forces draw spheres onto the ring of light, and the beam's orbital angular momentum drives them around the circumference, as shown in FIG. 17(*d*). The resulting motion entrains a flow of both fluid and particles in a way indicating advantages for pumping and mixing extremely small sample volumes.

Figure 18A:
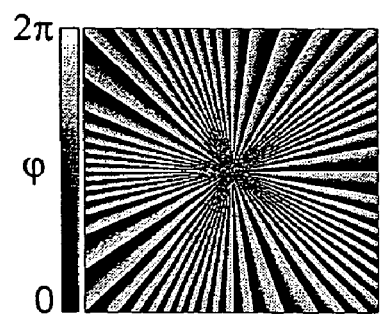
FIG. 18(a) shows the phase modulation for a modulated optical vortex with m=5, α=0.1.
Figure 18B:
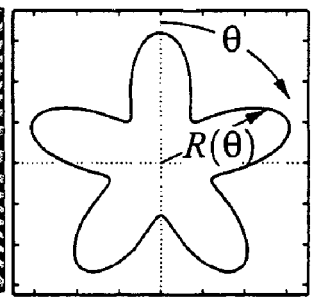
FIG. 18(b) shows the predicted radial profile R(θ) for the phase modulation for a modulated optical vortex with m=5, α=0.1.
Figure 18C:
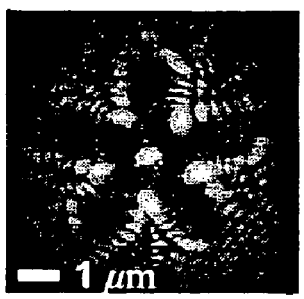
FIG. 18(c) shows the experimental intensity distribution for the phase modulation for a modulated optical vortex with m=5, α=0.1.
Figure 19:
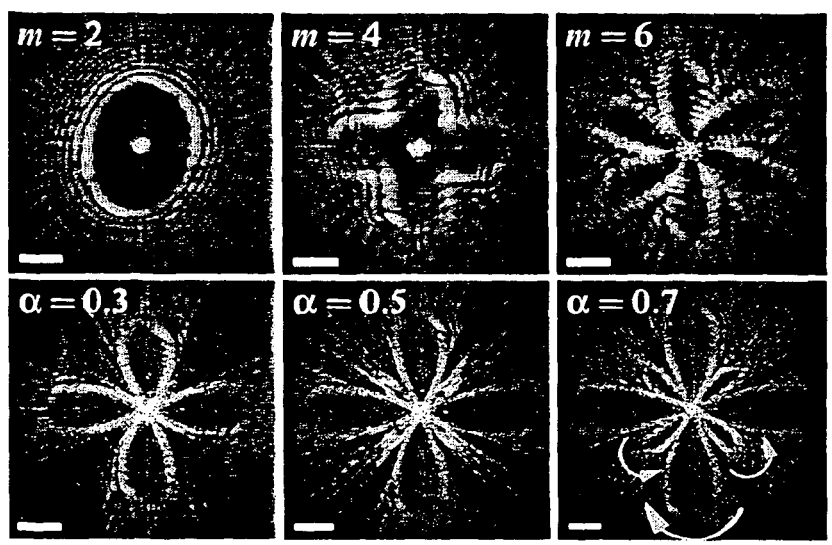
FIG. 19 shows modulated optical vortices at α=0.1 with m=2, 4, and 6, (top) and at m=4 with α=0.3, 0.5, and 0.7 (bottom), wherein additional lobes appear in the lower patterns for α>α$_c$≈0.25 with the direction of tangential forces indicated by arrows, and wherein all patterns were created with l=60 and scale bars indicate 1 μm.

FIGS. 18(*a*)–18(*c*) show how periodically modulating an optical vortex's phase affects its geometry. The phase mask in FIG. 18(*a*) includes an m=5 fold modulation of amplitude $\alpha$=0.1 superimposed on an l=60 helical pitch. The radial profile predicted with Eq. (13) appears in FIG. 18(*b*) and agrees well with the observed intensity distribution in FIG. 18(*c*). Comparably good agreement is obtained with our apparatus for modulated helical phases up to m=12 and $\alpha$=1 and l=60. FIG. 19 shows typical intensity patterns obtained by varying m with fixed depth of modulation $\alpha$, and by varying $\alpha$ with fixed m. Increasing the modulation beyond $\alpha_c=(l_0/l+1)/m$ causes the locus of maximum intensity to pass through the origin and to create lobes of negative parity, as shown in the last two images in FIG. 19.

Figure 20:
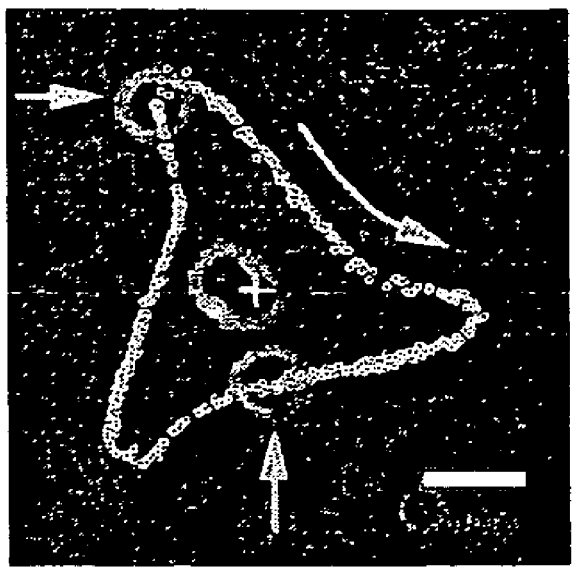
FIG. 20 shows two particles' transit around a modulated optical vortex, where data points show the positions of two 800 nm diameter polystyrene spheres measured at 1/10 sec intervals over 10 sec.

Just as uniform optical vortices exert torques on trapped particles, modulated optical vortices can exert tangential forces. These forces can drive particles through quite complicated trajectories, as demonstrated in FIG. 20. In this instance, two 800 nm diameter polystyrene spheres dispersed in water are shown circulating around a three-fold modulated optical vortex, each completing one circuit in about two seconds. The two spheres, indicated by arrows, move along a trap with l=60, m=3, and $\alpha$=0.1 at 300 mW, in the direction indicated by the curved arrow. Two additional spheres are trapped motionlessly in the undiffracted central spot. Whereas spheres travel more or less uniformly around a conventional optical vortex, such as the example in FIGS. 17(*a*)–17(*d*), they tend to circulate most rapidly where $R(\theta)$ is smallest in modulated patterns. This arises both because the light is most intense at smaller radii, and also because artifacts due to the SLM's finite spatial resolution tend to have a more pronounced effect on the traps' structures at larger radii. Diminishing intensities at larger radii also tend to weaken the traps at deeper modulations such as those shown in FIG. 19. Deeply modulated patterns tend to project particles traverse to the beam, rather than circulating them. Such optically mediated distribution are useful for manipulating samples in microfluidic devices. Unlike distribution methods based on translating discrete optical tweezers, the present approach can be implemented with a single static diffractive optical element.

In addition to translating particles, the forces exerted by modulated optical vortices can be used to distinguish particles on the basis of their size, shape, and optical properties. Consequently, modulated optical vortices can also provide a basis for sorting and fractionating mesocopically sized materials.

A modulated optical vortex can be rotated to any angle by varying $\beta$ in Eq. (14). An asymmetric object comparable in extent to the trapping pattern can be immobilized on the pattern's asperities, and its orientation controlled by varying the phase angle. The negative-parity lobes of deeply modulated optical vortices exert retrograde tangential forces useful for canceling the overall torque on large illuminated objects. Comparable controlled rotation has been implemented by interfering an optical vortex with a conventional optical tweezer, and by creating optical traps with elliptically polarized light. Using this approach, the trapped object can be oriented by a single beam of light without mechanical adjustments; the intensity distribution can be tailored to the targeted sample's shape through Eq. (4); and the same apparatus can create multiple independent rotators simultaneously. These enhanced capabilities allow applications for modulated optical vortices in actuating microeletromechanical systems (MEMS) such as pumps and valves in microfluidic and lab-on-a-chip devices.

In the preferred embodiment of the invention, the phase function can be calculated to achieve selected effects and uses. In one embodiment, Eq. (13) can be applied to a more general class of open-ended optical intensity patterns. In particular, consider a line transverse to the optical axis at distance b. In polar coordinates, this line has the equation:

$$R(\theta) = \frac{b}{\sin\theta}. \quad (15)$$

Substituting this into Eq. (13) and solving for the associated phase modulation yields.

$$\varphi_b(\theta) = b\frac{\ell_0 NA}{A}\ln\left(\tan\frac{\theta}{2}\right) - \ell_0\theta. \quad (16)$$

This phase function is plotted in FIG. 21. in practice, this function must be encoded on a device such as a phase-only spatial light modulator (SLM) capable of modulating the phase of an incident light beam. For illustrative purposes, therefore, the phase function is plotted modulo $2\pi$, without loss of generality.

The resulting intensity profile in the focal plane or a trap-forming objective lens is shown in FIG. 22, together with arrows 210 and 220 indicating the direction of transverse momentum transfer along the lines of maximum intensity. In practice, the lines' intensity falls off as $1/r^{3/2}$ with distance r from the optical axis 230. For clarity's sake, the calculated intensity has been multiplied by $r^{3/2}$ in FIG. 22.

The primary observation is that Eq. (16) successfully implements a linear intensity distribution transverse to the optical axis that carries angular momentum along its length. This confirms that Eq. (13), which previously had been used only to design sinusoidally modulated optical vortices, also is useful for designing more general intensity distributions for more general applications. Therefore, in general Eq. (13) can be solved for a given designated radius vector, $\vec{r}$, to solve for the desired phase modulation, $\phi(\vec{r})$. Hereinafter, various examples are provided for typical R($\phi$) profiles, such as a parabola and hyperbola.

FIGS. 23–24 show the intensity pattern from the same phase modulation of FIG. 21 imaged in planes 5 micrometers above and below the focal plane. These illustrate aspects for the three-dimensional structure of the intensity distribution of the beam of light forming parallel accelerators in the focal plane.

The linear transverse optical accelerator appears as a pair of counterpropagating lines in order to reasonably handle the logarithmic dependence in Eq. (16). Other types of transverse optical accelerators do not share this limitation. The lines' mottled appearance results from the limited resolution used to calculate this diffraction pattern. In particular, the phase pattern of FIG. 21 consists of a 480×480 square array of phase pixels, chosen to accommodate the physical apparatus used to demonstrate this embodiment.

This type of preferred transverse optical accelerator has advantageous applications in sample handling for microfluidic and lab-on-a-chip systems. Because the light whose intensity is plotted in FIG. 22 also imparts linear momentum along the loci of maximum intensity, these intensity patterns can be used to transport materials in the focal plane. Applications include, for example, manipulating and passing macromolecules, colloidal particles nanoclusters, biological cells, and the like through microfluidic channels. In particular, such optical translators can be used to move objects into regions where electrophoresis, fluid flow, magnetophoresis or other external manipulation schemes cannot be applied, or are impractical. Unlike such other approaches that require external plumbing or electrical access, transport with transverse optical accelerators requires only optical access.

Other profiles R($\theta$) also yield optical transverse accelerators with some advantages over the linear form described above. Particular examples include, for example:

parabola: centered on optical axis $$R(\theta) = \frac{\alpha}{1 + \cos\theta} \quad (17)$$

$$\varphi(\theta) = \ell_0 \left[ \frac{\alpha NA}{\lambda A} \tan\frac{\theta}{2} - \theta \right] \quad (18)$$

hyperbola: focus on optical axis $$R(\theta) = \frac{\alpha(\varepsilon^2 - 1)}{1 + \varepsilon \cos\theta}, \quad \varepsilon > 1 \quad (19)$$

$$\varphi(\theta) = \ell_0 \left\{ \frac{2\alpha NA}{\lambda A}(\varepsilon^2 - 1) \tanh^{-1}\left[\frac{(\varepsilon - 1)\tan\frac{\theta}{2}}{\sqrt{\varepsilon^2 - 1}}\right] - \theta \right\} \quad (20)$$

Both of these more general transverse accelerators also have been created using a dynamic holographic optical tweezer apparatus and have been demonstrated to transport particles in a direction determined by the sign of the amplitude a. These patterns have a substantial benefit over the linear form in that the defocused intensity pattern retains the overall pattern in the focal plane. With appropriate control over aberrations, therefore, these transverse accelerators operate as optical traps in the axial direction, and so are useful for manipulating materials along planar trajectories in the middle of a three-dimensional system.

In a preferred form of the invention, gradient force optical traps, such as holographic optical tweezers, are advantageously modified to overcome a variety of optical aberrations. However, as will be described hereinafter, the method and system can be applied to a variety of optical systems. In the preferred form of the invention, forces are exerted by strongly focused beams of light to form optical traps to precisely manipulate small volumes of matter. Optimal trapping requires each beam of light to be brought to a diffraction-limited focus. Aberrations degrade the quality of focus and thereby degrade the ability of the resulting focused beam of light to operate as a trap.

This invention is directed toward correcting the aberrations in one or more beams of light so as to optimize optical trapping. The particular implementation involves calculating a phase-shifting diffraction grating encoding the corrections to measured aberrations, and projecting this diffraction grating in conjunction with another diffraction grating encoding a pattern of one or more optical traps. In practice, the combined diffraction gratings can be projected with a computer-addressable device such as a phase-only spatial light modulator (SLM) and so would provide a means for dynamically correcting aberrations in a dynamic holographic optical tweezer system.

Figure 5:
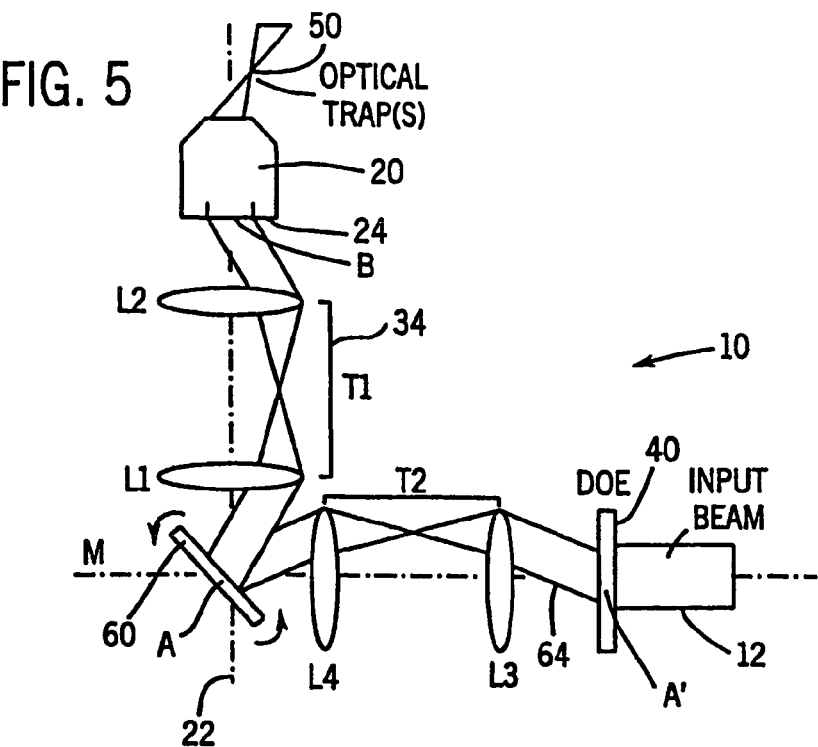
FIG. 5 illustrates a prior art system with a continuously translatable optical tweezer (trap) array using a diffractive optical element.
Figure 6:
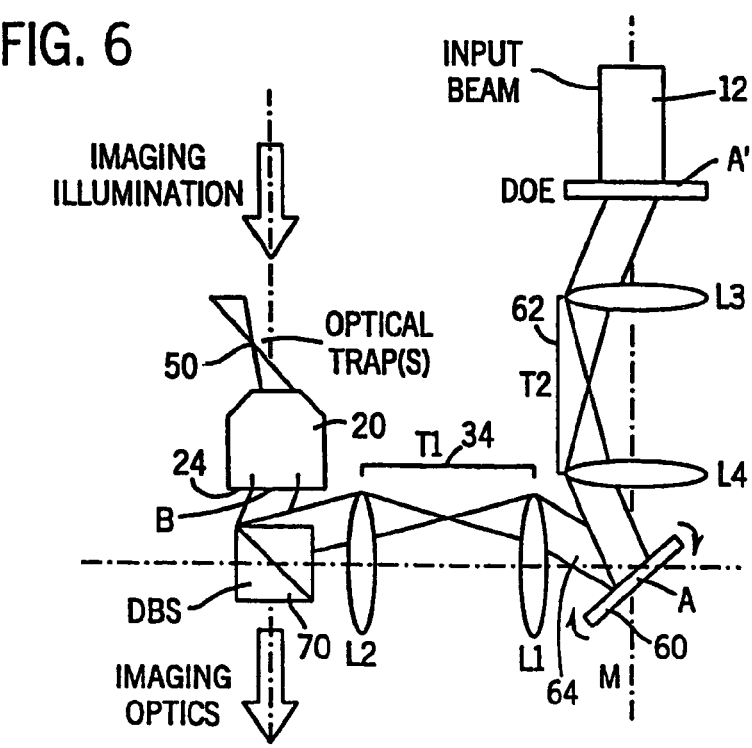
FIG. 6 illustrates a prior art method and system for manipulating particles using an optical tweezer array while also forming an image for viewing the optical trap array.
Figure 7A:
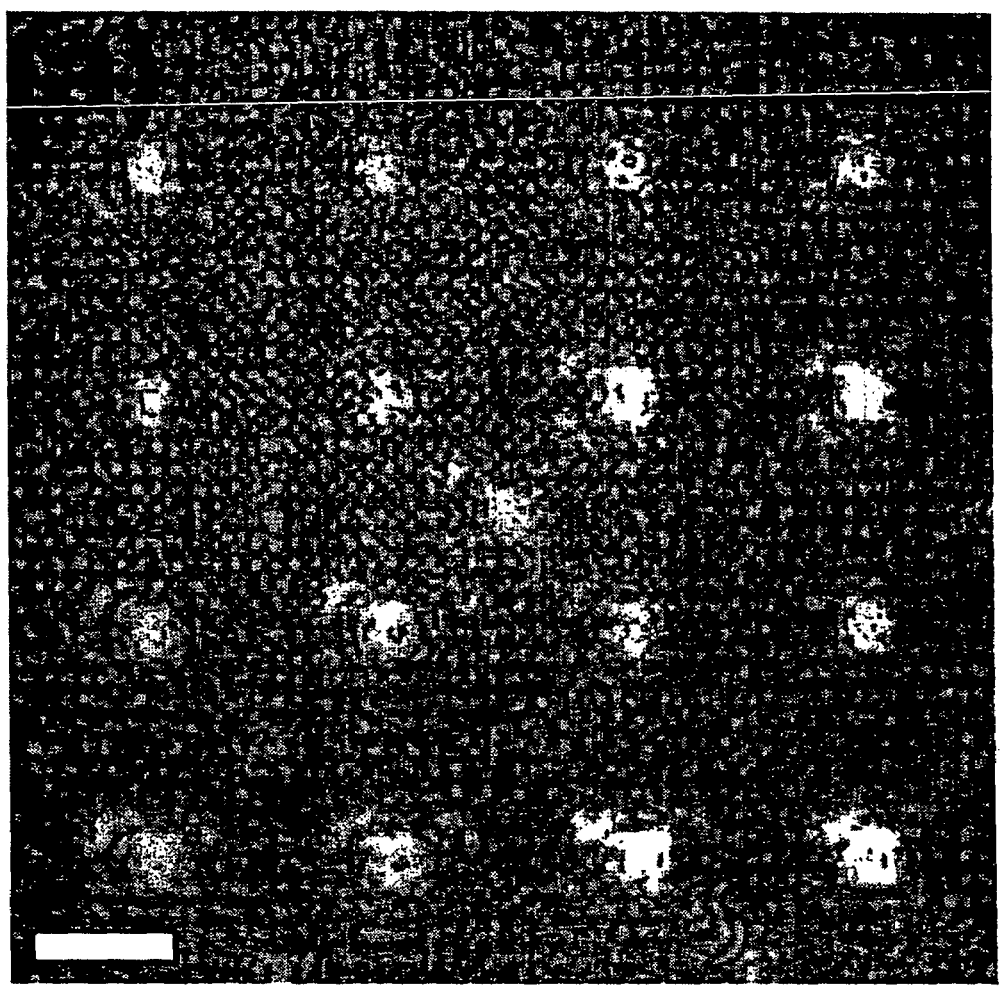
FIG. 7A illustrates an image of a four by four array of optical tweezers (traps) using the prior art optical system of FIG. 6.
Figure 7B:
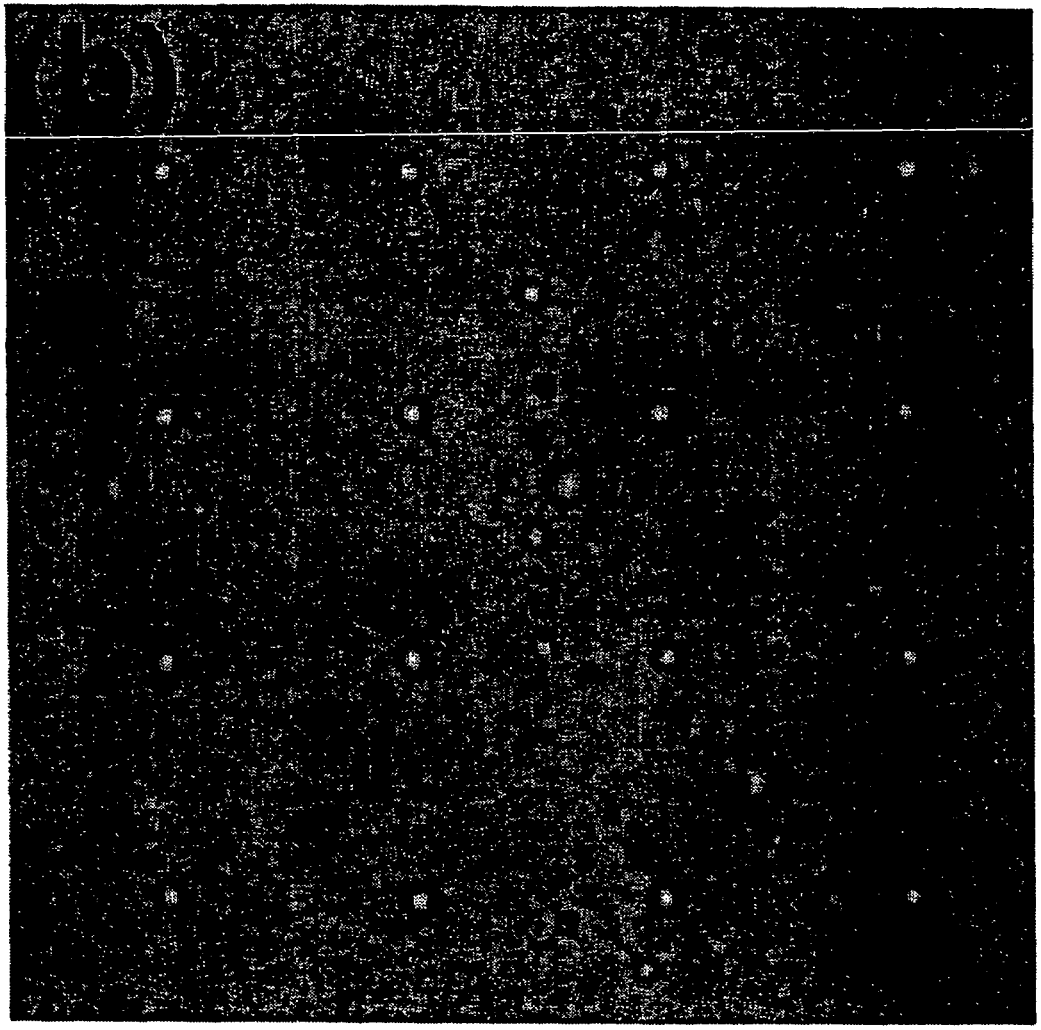
FIG. 7B illustrates an image of one micrometer diameter silica spheres suspended in water by the optical tweezers of FIG. 7A immediately after the trapping illumination has been extinguished, but before the spheres have diffused away.

The use of computer-generated diffractive optical elements (DOE) to create one or more optical traps and to imbue each with distinctive characteristics is known as the holographic optical tweezer (hereinafter, HOT) technique. Projecting diffractive optical elements with an updateable device such as an SLM 90 (see FIG. 10), makes possible additional manipulations and distinguishes the dynamic holographic optical tweezer technique from static HOTs. The present invention is most preferably applied to dynamic HOTs. In a system using a static but removable DOE, we can replace the DOE with a static vortex-forming phase mask 100 (see FIG. 10 and in phantom in FIGS. 3–6). The image of the resulting vortex can be used to compute the correcting phase mask 100 for that particular optical train. The optimizing phase mask 100 can be used to compute other static DOE's or can be fabricated and incorporated into the optical train, much as a Schmidt corrector is used in some reflecting telescopes. The phase mask 100 can take on any well known conventional form such as replacing the various DOE components (40 in FIGS. 3–5 or A in FIG. 6) with two DOEs placed back to back. One of the DOEs can be the trap forming component, and the other DOE can be the aberration correcting component. The pairs of DOEs preferably are placed in close proximity and in any order.

The five principal aberrations in a beam of light are characterized as spherical aberration, coma, astigmatism, field curvature and distortion. These may be introduced into an otherwise ideal beam of light by slight misalignment of the components of an optical train such as the relay lenses and focusing element in the HOT system 110 (see FIG. 10(*a*)). Describing the wavefront of a beam of light 130 by its complex-valued field $$\psi(\vec{r}) = A(\vec{r})\exp(i\phi(\vec{r})), \quad (21)$$

where $A(\vec{r})$ is the real-valued amplitude and $\phi(\vec{r})$ is the real-valued phase, any aberrations in the beam of light 130 may be described as spatial variations in $\phi(\vec{r})$ across the beam's aperture.

Without loss of generality, we may characterize the unaberrated beam as a collimated plane wave with constant phase across its wavefront. Introducing the five primary aberrations one can therefore use conventional formalities applied to this wavefront:

$$\varphi_a(\vec{r}) = (a_0/2^{1/2})(6\rho^4 - 5\rho^2 + 1) + \quad \text{spherical aberration} \quad (22)$$
$$a_1(3\rho^3 - 2\rho)\cos(\theta - \theta_1) + \quad \text{coma} \quad (23)$$
$$a_2\rho^2[2\cos^2(\theta - \theta_2) - 1] + \quad \text{astigmatism} \quad (24)$$
$$(a_3/2^{1/2})(2\rho^2 - 1) + \quad \text{field curvature} \quad (25)$$
$$a_4\rho\cos(\theta - \theta_4) \quad \text{distortion} \quad (26)$$

Here, $\rho = r/\alpha$ is the radius from the beam's axis in units of the aperture's radius, a, and $\theta$ is the polar angle in the plane of the wavefront. The five coefficients, $a_0$ through $a_4$, and the associated angles $\theta_1$, $\theta_2$ and $\theta_4$ completely specify the beam's aberrations.

These coefficients and angles can be measured by projecting one or more optical traps using the HOT system 110 and creating images of the resulting light using a imaging system such as a video camera 120. Multiplying each of the coefficients by −1 results in a new aberration pattern $\phi_c(\vec{r})$ which exactly counteracts the aberrations already in the beam. Projecting $\phi_c(\vec{r})$ with the SLM 90 in a dynamic HOT system therefore will correct the aberrations in the beam of light 130 and result in an unaberrated form of optical trap.

The aberration-correcting phase mask 100 can be combined with other trap-forming diffraction patterns to improve those patterns' trapping abilities. For example, consider a phase pattern $\phi_0(\vec{r})$ encoding a particular pattern of traps. When projected through the HOT optical system 110, the resulting traps all will be degraded by aberrations introduced by the optical train. The combination $$\phi(\vec{r}) = [\phi_0(\vec{r}) + \phi_c(\vec{r})] \mod 2 \quad (27)$$

projects the same pattern of traps, but with their aberrations corrected. Here, the mod operator represents the scaling and discretization needed to encode the phase pattern on the face of the SLM 90.

The same composition of phase patterns can be used to correct any trapping pattern projected with the HOT system 110. Consequently, the combination of one-time calibration and per-use correction offers a straight-forward means to correct for physically-introduced aberrations under software control without aligning or otherwise adjusting the physical components of the optical train of the HOT system 110. Such calibration can be repeated periodically to maintain optimal aberration correction even as physical components' alignment drifts over time. Dynamically fine-tuning optical alignment under software control offers the additional benefit of relaxed manufacturing tolerances and maintenance schedules on commercial HOT systems.

The preferred form of the invention is concerned with a quantitative approach to aligning optical trapping systems, and in particular those incorporating the SLM 90 or other optical elements capable of shaping the wavefront of the trapping light. This method will be particularly useful for aligning dynamic holographic optical tweezers.

A preferred form of the invention involves projecting a mode of light such as an optical vortex whose appearance depends obviously and sensitively on defects in alignment. An optical vortex is a mode of light used in optical tweezers for various applications, including trapping and manipulating optically absorbing materials. An optical vortex is created by modifying the phase profile of the incident laser beam of light 130 with a phase-shifting form of optical element (namely, the phase mask 100, such as a modified form of the computer-generated DOE 140 applied by using the SLM 90).

Figure 8A:
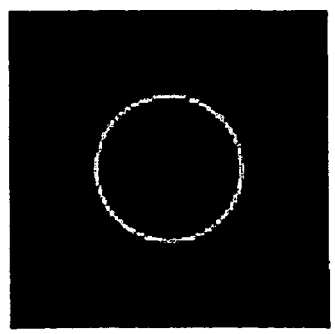
FIG. 8A illustrates a calculated image of an ideal optical vortex with topological charge l=100.

The incoming laser wavefront is described by its complex-valued field:

$$\psi(\vec{r}) = A(\vec{r})\exp(i\phi(\vec{r})), \quad (28)$$

where $A(\vec{r})$ is the real-valued amplitude and $\phi(\vec{r})$ is the real-valued phase at position $\vec{r}$ relative to the system's optical axis in the DOE plane. The phase modulation encoding an ideal optical vortex is $\phi(\vec{r}) = l\theta$ where $\theta$ is the polar angle in the DOE plane relative to an arbitrary but fixed direction, and l is an integer known as the topological charge. Because of the destructive and constructive interference mediated by this phase modulation, an optical vortex appears in the focal plane of a system 110 as a donut ring of light approximately as thick as $\lambda$, the wavelength of light, and with a radius R proportional to the topological charge l. A typical example of the optical intensity pattern of a optical vortex in the focal plane of the HOT system 110 is shown in FIG. 8A.

Figure 8B:
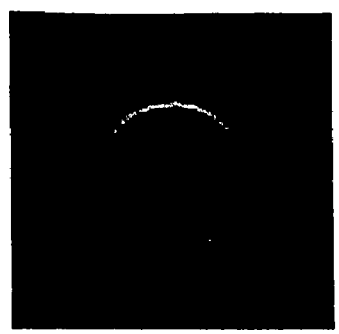
FIG. 8B illustrates a calculated image of the same vortex of FIG. 8A, but with the center of the diffractive optical element encoding the vortex displaced by 5 percent of its aperture diameter.
Figure 8C:
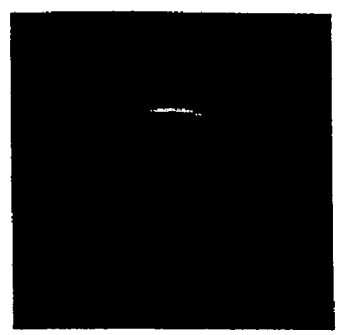
FIG. 8C illustrates a more extreme displacement of the vortex-forming phase mask from the optical axis, in this case 10 percent of the aperture diameter.

An ideal optical vortex in a perfectly aligned optical trapping system with an axially symmetric Gaussian input laser beam should appear evenly illuminated, perfectly circular and centered with respect to an optical tweezer projected with the same system by setting $\phi(\vec{r}) = 0$. Focusing up and down through the vortex should reveal a growing and blurring circle, concentric with the focused vortex. The structure of an optical vortex depends sensitively on details of the phase function $\phi(\vec{r})$. Imperfections in the optical train, such as misalignment of optical elements, modify the phase profile and thus the vortex's appearance. For example, if the phase modulation $\phi(\vec{r})$ encoding the optical vortex in the phase mask 100 is not centered on the optical axis (such as, for example, because the SLM 90 is misaligned) the vortex's uniform circular appearance degrades into an asymmetric pattern of bright and dark regions, as shown in FIGS. 8A and 8B. Such misalignment would not be readily observed in the properties of conventional optical tweezers projected with the same system, but nonetheless would degrade performance, particularly for complicated optical trapping patterns.

Other misalignments within the optical train introduce aberrations into the beam and manifest themselves in characteristic distortions of the projected vortex's appearance, as shown in FIGS. 9A–9F. The five principal aberrations affecting an optical train in the system 110, such as shown in the example HOT system in FIG. 10(*a*), include coma, astigmatism, spherical aberration, curvature of field, and distortion. There are other conventional aberrations and they can in this manner be treated in accordance with the methods described herein.

Figure 9A:
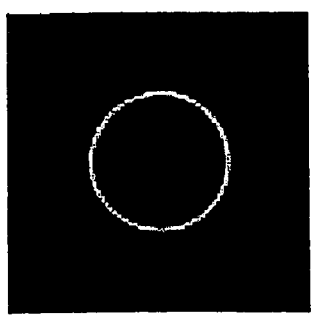
FIG. 9A shows an undistorted vortex.
Figure 9B:
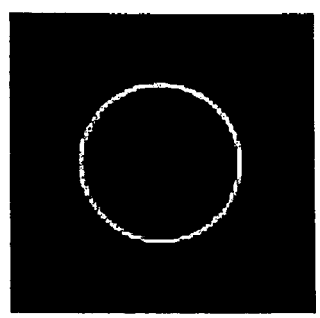
FIG. 9B shows a vortex uffering from 10 λ of spherical aberration.
Figure 9C:
FIG. 9C shows the influence of 10 λ coma aberration.
Figure 9D:
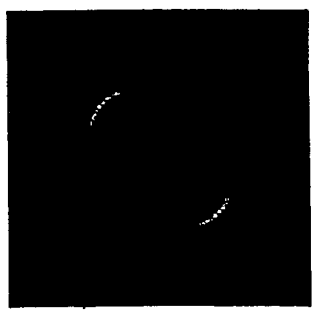
FIG. 9D shows the influence of 10 λ of astigmatism.
Figure 9E:
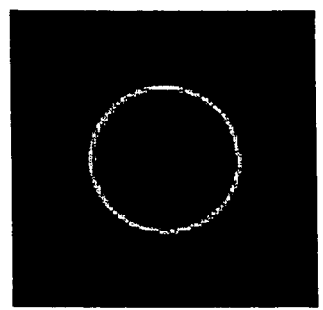
FIG. 9E shows the influence of 10 λ of field curvature.
Figure 9F:
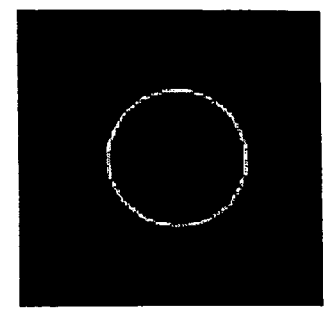
FIG. 9F shows the influence of 10 λ of pincushion distortion.

Each aberration component has its own particular signature in the structure of a projected optical vortex. Spherical aberration increases the vortex's diameter and reduces its axial intensity gradients, as shown in FIG. 9B. In yet another aberration effect, coma distorts the vortex away from circularity and redistributes light so that one side is brighter than the other, as in FIG. 9C. Unlike coma, astigmatism distorts a vortex into a symmetric ellipse and redistributes its intensity symmetrically, as shown in FIG. 9D. Curvature of field redistributes a vortex's intensity along the radial direction, as shown in FIG. 9E and also reduces the intensity along the radial direction. The typical abrupt change to maximum intensity is softened. Finally, distortion shifts the center of the vortex away from the optical axis as shown in FIG. 9F. This is a slightly more difficult aberration to identify in that its influence resembles that due to centration errors. However, the shift due to distortion does not affect the intensity distribution around the ring, and so it can be distinguished from degradation due to centration errors.

Each of these distortions can be measured from images of projected vortices more accurately than can their more subtle counterparts in images of conventional optical tweezers. Furthermore, these distortions can be measured quantitatively with a conventional computer imaging system. The results can be used to improve the alignment of the various physical optical elements in the HOT system 110. Alternatively, and preferentially, the measured distortions can be corrected in software by computing the phase mask 100 which exactly compensates for the measured defects. The resulting aberration-correcting phase mask 100 can be incorporated into other DOE's encoding desired arrangements of optical traps. In this way, the aberration-correcting phase mask 100 will correct the aberrations in the DOE-produced traps and thereby improve their performance.

Aberration measurement and compensation can be accomplished automatically by alternately projecting modified vortex patterns and measuring the resulting intensity distribution under computer control.

As an example of this approach's utility, we discuss its use for aligning the particular HOT system 110, shown schematically in FIG. 10. The aligned components include the laser beam of light 130, the SLM 90, transfer optics 140, and microscope objective 150. Ideally, the laser beam of light 130 can be in a single Gaussian mode or some other well known mode which is symmetric about optical axis 160. This insures that when the system 110 is perfectly aligned, the intensity around a projected optical vortex's circumference will be constant. When the optical train is aligned, the beam of light 130 strikes the center of the SLM 90, passes along the optical axis 160 through the center of each lens in the transfer optics 140, enters the back aperture of the objective lens 150 centered, and just slightly overfills the lens' input pupil.

In FIG. 10(*a*) a collimated laser beam of light 130 is incident on the front face of the computer-addressed SLM 90. The phase modulation 95 $\phi(\vec{\rho})$ imparted by this SLM onto the beams wavefront splits the single input beam of light 130 into multiple beams of light 135, each with individually specified characteristics. These multiple beams 135 are relayed by two lenses 145 in a telescope configuration to the back aperture of a high-numerical aperture focusing element, here depicted as the microscope objective lens 150 (although any conventionally available focusing element can be used). The lens focuses each beams into a separate optical trap. The projected light 135 can be focused onto the surface of a mirror placed temporarily in the sample plane. Light reflected by the mirror is collected by the same objective lens 150, passes through a dichroic mirror 155 and forms an image 160 on the attached CCD camera 120. This makes possible direct measurement of the intensity $I(\vec{r})$ of light in the focal plane.

Any deviation from ideal alignment is easily detected in the appearance of an optical vortex. For instance, imprecise alignment of the relay lenses 145 relative to the optical axis results in coma and would degrade a projected vortex as in FIG. 9C. Tilting the lenses 145 relative to the optical axis introduces astigmatism, which has a different appearance. Imperfect surface figures on the lenses 145 or the SLM 90 can introduce distortion or spherical aberration, each of which has its characteristic appearance. These defects' influence on a vortex's image need not combine linearly. Even so, a nonlinear iterative search algorithm can be used to fit an image of a distorted vortex to a model incorporating the effects of centration error and the five principal aberrations. The parameters obtained from such a fit can be used to compensate for centration errors and to compute the best phase mask 95 to correct for other aberrations. The success of this method and system can be gauged by projecting nominally corrected optical vortices and characterizing their distortions.

In a most preferred embodiment a particular order of performing the aberration correction involves the following series of steps:

Locate the Optical Axis on the Video Camera: Send a uniform phase pattern such as $\phi(\vec{\rho})=0$ to the SLM 90. This results in a single undiffracted beam being projected by the SLM 90 onto the mirrored surface of the mirror 155, and thence back onto the video camera 120. The location of this beam on the face of the video camera 120 defines the location of the optical axis. We will refer to this position as $\vec{r}_0=(X_0, Y_0, 0)$.

The intensity of the input laser beam 130 should be adjusted so that the undiffracted spot is visible on the camera 120, but does not saturate it. If the undiffracted spot cannot be located in the field of view, then the optical train is too far out of alignment to proceed, and physical alignment is required.

Establish the Trapping System's Geometry: The spatial relationship between a designed trapping pattern and the projected result can be described by three parameters, a scaling factor mx in the $\hat{\ell}$ direction on the SLM 90, another scaling factor my in the $\hat{y}$ direction on the SLM 90, and a relative orientation θ between the SLM 90 and the video camera 120. We assume in this section that any distortion due to the imaging system have been previously measured and are corrected. The three parameters can be measured by sending a kinoform to the SLM 90, encoding a simple array of traps, such as a 4×4 square pattern, and imaging the resulting intensity in the focal plane using standard methods of digital video microscopy. In particular, we measure the positions of each of the projected traps based on the center of intensity for each focused spot of light. The traps' relative separations can be analyzed using methods of computational geometry to derive the scale factors, mx and my and the orientation θ. The two scale factors need not to be identical if the SLM 90 is aligned at an oblique angle with respect to the incident laser beam 130, as is necessary in some optical tweezer implementations. If normal incidence is desired in another implementation, a determination that $m_x$ and $m_y$ are not equal can be used to measure the SLM's inclination with respect to the optical axis.

For this operation, the intensity of the input laser beam 130 should be adjusted so that the diffracted spots are visible on the video camera 120, but do not saturate it. Once the scale factors and orientation are known, they can be used to place traps precisely in the field of view and to remove distortions in the trapping patterns due to the SLM's alignment relative to the optical axis.

Locate the Optical Axis on the SLM: Once the center of the field of view and the scaling factors have been established, they can be used to locate where the optical axis passes through the face of the SLM 90. To do this, we transmit a kinoform to the SLM 90 encoding an optical vortex, taking into account any scale-factor corrections due to oblique incidence of the laser beam on the SLM's face. For an optical train in which $m_x=m_y$, the phase pattern $\phi(\vec{p})=l\theta$ converts a Gaussian input laser beam into a helical Laguerre-Gaussian beam with topological charge l which is focused into a corresponding optical vortex trap. This pattern is modified in a straightforward manner to account for any asymmetry revealed in the previous step.

When the optical train is properly aligned, an optical vortex should focus to an annular intensity pattern centered on the optical axis with uniform intensity around the circumference. If the center of the phase pattern is not aligned with the optical axis, however, then the ring of light focuses to a distorted annulus with nonuniform intensity. Translating the phase pattern on the face of the SLM 90 under software control can be used to optimize the projected vortex's circularity, centration on the optical axis at the video camera, and uniformity.

The offset $\rho_0$ in the SLM plane which optimizes the projected vortex's appearance may be identified as the location of the optical axis on the face of the SLM 90. This measurement may be used to adjust the physical position of the SLM 90 so that the optical axis is centered on its face. In that case, the previous two steps should be repeated.

Alternatively, the measured offset can be used to center other kinoforms on the SLM face so that their centers are aligned with the optical axis. This approach does not require any alteration of the physical apparatus and can be applied provided that the offset is not too large. Some combination of physical alignment and virtual alignment may provide the best results for a particular application.

Measure the Effective Input Aperture: The objective lens 150, the relay optics (the lenses 145) and the SLM 90 are combined into an optical train whose effective aperture may not be known a priori, or else may depend on details of the optical train's alignment. The aperture's radius R relative to the optical axis on the face of the SLM 90 can affect a kinoform's ability to create a desired trapping pattern, and ideally should be factored into the algorithm used to compute kinoforms for the system.

Once $\rho_0$ is determined in the previous step, a virtual aperture can be established by modifying the vortex-forming kinoform in the previous step by setting $\Phi(\vec{p})=\Phi_0$, where $\Phi_0$ is a constant for $|\rho-\rho_0|\geq R$. IF is larger than the physical effective aperture at the SLM plane, then this modification will not alter the appearance of the vortex in the video camera 130. Projecting such kinoforms in which R is reduced sequentially until a change in the projected vortex's appearance is visible can be used to establish the aperture radius.

If the aperture turns out to be comparable to the size of the SLM's face, then this should be used as both the size and shape of the effective aperture. Once the effective aperture has been measured, it can be used to calculate kinoforms optimized for this aperture. This value, together with the lengthscale calibration of the imaging system, is needed to calculate the expected appearance of an optical vortex. Deviations of the calculated and measured appearance can be used to gauge and correct for other defects in the optical train's alignment.

Measure and Correct for Spherical Aberrations: An optical vortex's appearance can be used to measure the previously described five principal aberrations to which the present class of optical trains may be subject. These aberrations may be introduced by misalignment of the relay optics, the lenses 145, for example through tilting or displacement of the individual lenses relative to the optical axis. They may be inherent in the input beam used to illuminate the SLM 90. In practice, they may be introduced by some combination of these.

Once the aberrations have been measured, their severity can be used to gauge whether or not the physical optical train requires realignment. If so, then all of the preceding steps would preferably be repeated. Alternatively, the measured aberrations can be used to calculate a compensating phase mask. This phase mask 95 can be combined with kinoforms encoding patterns of traps to correct the aberrations in the resulting trapping patterns.

The complexity of the compensating phase mask 95 will limit the complexity of the trapping patterns which can be projected with the system. Measuring the compensating phase mask's complexity, such as by examining its spatial correlation function, provides another way to determine whether or not the physical optical train requires realignment.

While adequate results might be obtained by analyzing the intensity distribution of a single optical vortex, repeating the measurement with a variety of vortices might well improve the accuracy of the distortion measurement and would highlight other imperfections such as nonuniform illumination which would not be addressed by the above analysis.

This technique also is a quick and easy method to study the profile of the incoming laser beam of light 130. Knowledge of this profile could allow for educated hardware adjustments to modify the beam. A knowledge of the incident beam profile is also very useful because the phase mask 100 used for the HOTs are created with an assumption of the beam profile, and they are most efficient if the correct beam profile is used. While other methods, such as imaging with the CCD camera 120, may allow similar analysis of the beam, this is non-invasive technique requires no extra equipment, setup time or a potential risk of disturbing the physical alignment during measurement.

In another form of the invention optical vortices can be used for applying controlled torques to objects ranging in size from a nanometers to hundreds of micrometers and conceivably even larger sizes.

Helical beams can be generated from conventional modes of light using a variety of mode converters, with most implementations yielding topological charges in the range $1 \leq l \leq 8$. By contrast, dynamic holographic optical tweezers can generate helical modes up to $l=200$, and so are ideal for studying how optical vortices' properties depend on their helicity.

Figure 10A:
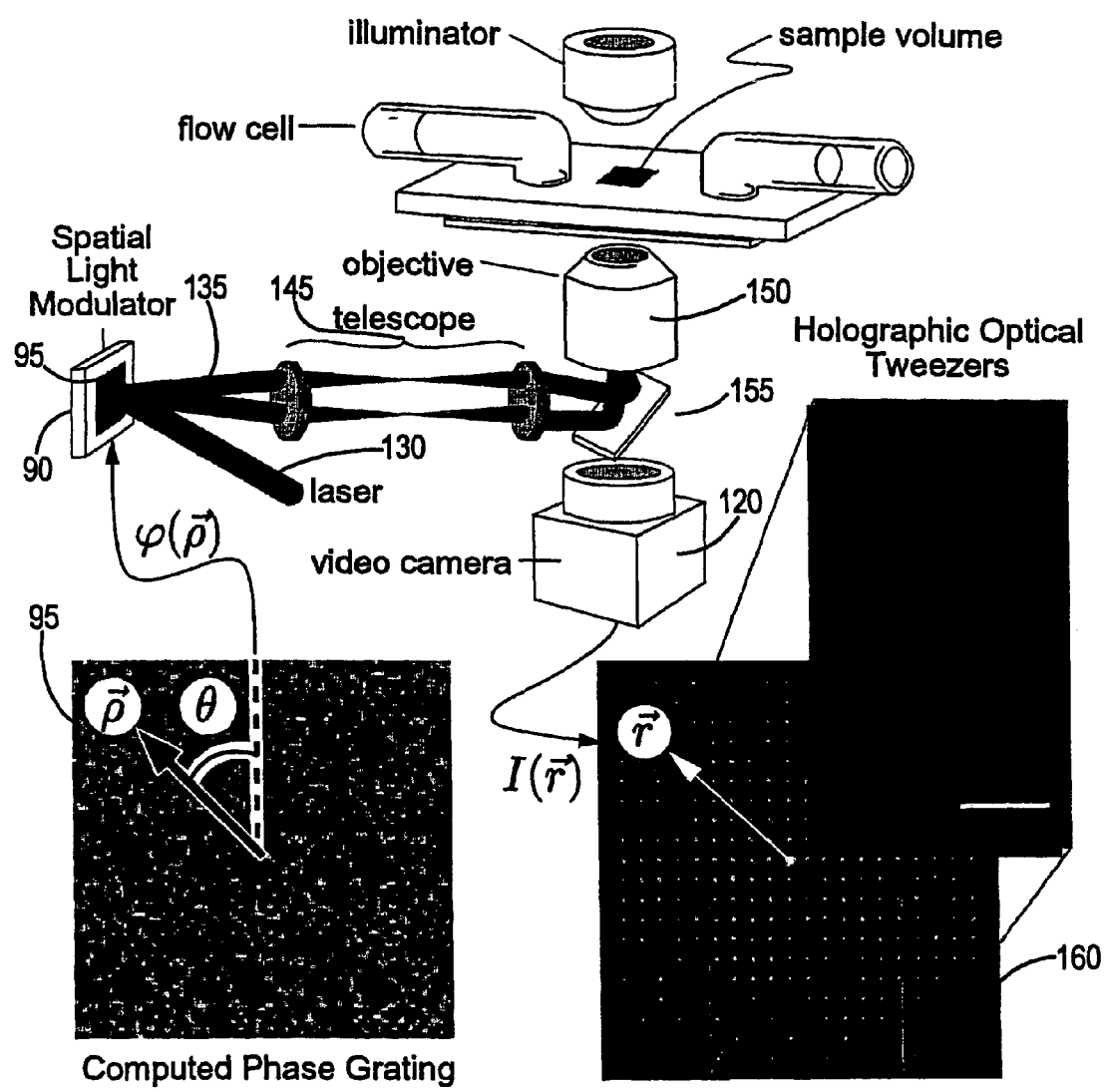
FIG. 10(a) is a schematic diagram of a dynamic holographic optical tweezer system.

Our system, depicted in FIG. 10(a), uses a Hamamatsu X7550 parallel-aligned nematic liquid crystal spatial light modulator (SLM) to imprint computer-generated patterns of phase shifts (See FIG. 10(b), for example) onto the wavefront of a $TEM_{00}$ beam at $\lambda=532$ nm from a frequency-doubled Nd: $YVO_4$ laser (Coherent Verdi). The modulated wavefront is transferred by a telescope to the back aperture of a 100×NA 1.4 oil immersion objective lens mounted in a Zeiss Axiovert S100TV inverted optical microscope. The objective lens focuses the light into optical traps, in this case a single optical vortex. The same lens also can be used to form images of trapped particles, and a dichroic mirror relays these images to an attached video camera.

Figure 10C:
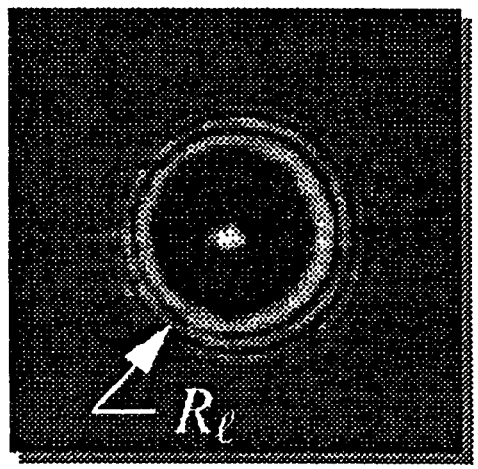
FIG. 10(c) is an image of an l=40 optical vortex obtained by placing a mirror in the objective's focal plane.
Figure 10D:
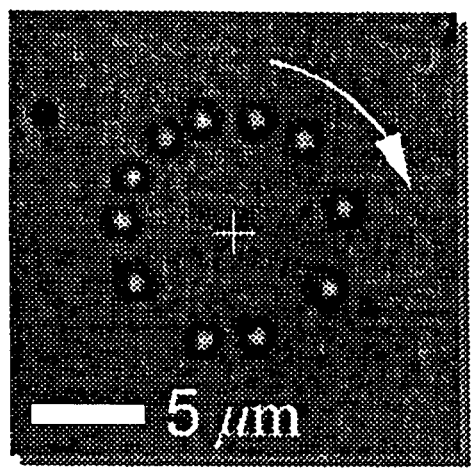
FIG. 10(d) is a time-lapse image at ⅙ sec intervals of a single colloidal sphere moving around an l=40 optical vortex.

The SLM can shift the light's phase to any of 150 distinct levels in the range $0 \leq \phi \leq 2\pi$ radians at each 40 μm wide pixel in a 480×480 square array. The calibrated phase transfer function is independent laser power. Imprinting a discrete approximation to the phase modulation $\phi \vec{r} = l\Phi$ mod $2\pi$ onto the incident beam, yields helical modes at $1 \leq l \leq 100$ with 50 percent efficiency. The efficiency is reduced at higher topological charges by the SLM's limited spatial resolution. FIG. 10(c) is a digital image of an $l=40$ optical vortex reflected by a mirror placed in the objective's focal plane. FIG. 10(d) shows a time-lapse multiple exposure of a single 800 nm diameter colloidal polystyrene sphere trapped on the optical vortex's circumference in an 85 μm thick layer of water between a coverslip and a microscope slide. Angular momentum absorbed from the optical vortex dries the sphere once around the circumference in a little under 2 sec at an applied power of 500 mW. The image in FIG. 10(d) shows 11 stages in its transit at ⅙ sec intervals. The same particle was studied at different topological charges and applied powers to establish how helicity influences optical vortices' intensity distribution and local angular momentum flux.

In general, the wavefunction $\psi(\vec{r})$ for a nearly-collimated beam of light can be expressed as a superposition of eigenmodes of the paraxial Helmholtz equation:

$$\left[ \frac{\partial^2}{\partial r^2} + \frac{1}{r}\frac{\partial}{\partial r} + \frac{1}{r^2}\frac{\partial^2}{\partial \theta^2} - 2ik\frac{\partial}{\partial z} \right] \psi(\vec{r}) = 0 \qquad (29)$$

For helical beams, the natural basis is the set of helical Laguerre-Gaussian ($LG_{p,l}$) eigenmodes whose radial dependence has the form $$u_p^l(r,z) = (-1)^p \left( \frac{\sqrt{2}r}{w} \right)^l L_p^l\left( \frac{2r^2}{w^2} \right), \qquad (30)$$

where $L_p^l(k)$ is a generalized Laguerre polynomial and w is the beam's radius [1].

$LG_{p,l}$ modes, $\psi_p^l(\vec{r}) = u_p^l(r,z)\exp(-ikz)\exp(il\theta)$, have vanishing intensities along their axes not only because of their helical topology, but also because their amplitudes vanish along r=0. Modes with radial index p have p+1 concentric rings of intensity maxima whose radii vary with l. Experimentally observed optical vortices are characterized by an annulus of light in the focal plane, and consequently have been identified with p=0 modes. The behavior of particles trapped in optical vortices therefore have been interpreted in light of the properties of $LG_{0,l}$ modes.

For example, the maximum intensity of a $LG_{0,l}$ mode occurs at a radius $R_l = w\sqrt{l/2}$. A wavelength-scale particle trapped on the circumference of such a vortex is illuminated with an intensity $I_l \propto P/(2\pi\lambda R_l)$ where P is the power of the input beam, and we assume that the photon flux is spread uniformly around the vortex's circumference in a band roughly λ thick (see FIG. 11). On average, each scattered photon transfers an angular momentum proportional to $l\hbar$. Thus, the particle's tangential speed should be proportional to $lP/R_l^2$, and the time required to make one circuit of the vortex should scale as:

$$T_{l(P)} \propto R_l^3/(lP) \qquad (31)$$

If, indeed, $R_l \propto \sqrt{l}$ then the particle's speed should be independent of l, and the period should scale as $\sqrt{l}/P$.

Figure 11:
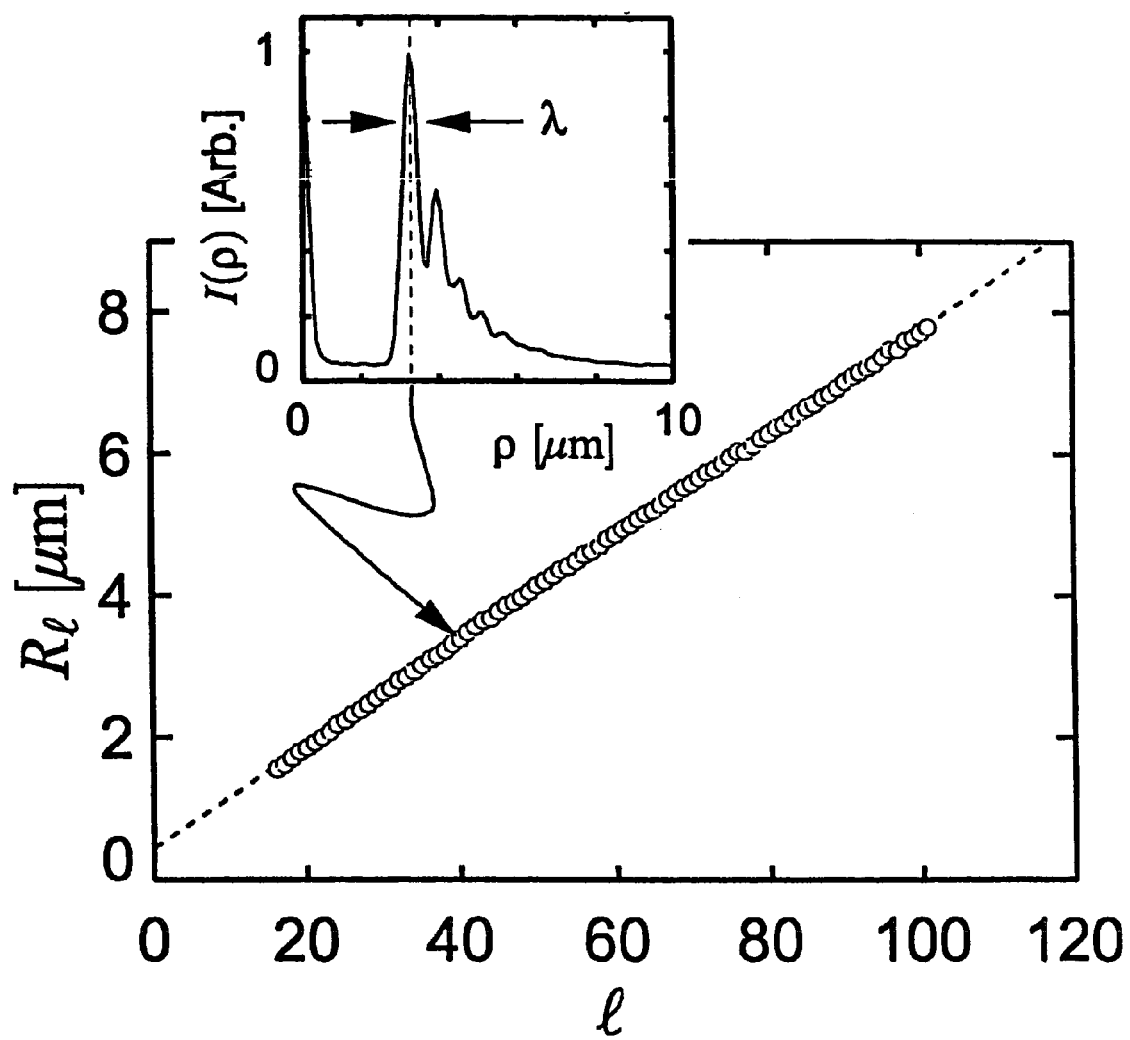
FIG. 11 illustrates the dependence of an optical vortex's radius $R_l$ on topological charge l and the inset shows azimuthally averaged intensity at l=40 from the image in FIG. 10(c)

The optical vortices produced by our apparatus also appear as rings of light and so might be expected to scale in the same way, However, the data in FIG. 11 reveal qualitatively different behavior. We obtain $R_l$ from digitized images, such as FIG. 10(c), by averaging over angles and locating the radius of peak intensity. Projecting a sequence of vortices with different values of l reveals that $R_l$ scales linearly with the topological charge, and not as $\sqrt{l}$.

This substantial discrepancy can be explained by considering the objective lens' action on the phase-modulated beam. The field in the focal plane of a lens of focal length f is related in scalar diffraction theory to the field at the input aperture (and thus at the face of the SLM) through a Fourier transform. Transforming the helical beam first over angles yields:

$$u_f(r,0) = \int_0^\Sigma r' u(r',-f) J_l\left( \frac{krr'}{f} \right) dr', \qquad (32)$$

where $J_l(x)$ is the lth order Bessel function of the first kind, and Σ is the input aperture's radius. Setting $u(r-f)=u_0$ for a uniform illumination yields:

$$\frac{\psi_l(r,\theta,0)}{\pi \Sigma^2 u_0} = e^{il\theta} \sum_{n=0}^\infty \frac{(-1)^{(n+\frac{l}{2})} \xi^{2(n+l)}}{\left(1+\frac{l}{2}+n\right)(l+n)!n!} \qquad (33)$$

where $\xi = kr\Sigma/(2f)$. The radius Σ of the principal maximum in $|\psi_l(r,\theta,0)|^2$ is approximated very well by:

$$R_l = a\frac{\lambda f}{\pi \Sigma}\left(1 + \frac{l}{l_0}\right), \qquad (34)$$

with a=2.585 and $l_0$=9.80. The experimental radii in FIG. 11 are increased beyond this diffraction limit by aberrations in our optical train, and are described instead by a=5, and $l_0$=3.61.

An equivalent result may be obtained by expanding the incident beam's radial profile in a series of LG radial modes $U_l^p$, all with the same l. Contributions from the higher-p modes are evident both in the nearly linear dependence of $R_l$ on l, and also in the hierarchy of diffraction fringes surrounding the principal maximum in FIG. 10(c). Even if a pure $LG_{0,q}$ mode were used to illuminate the SLM, the restrictive aperture of a high-numerical-aperture optical trapping system leads to comparable linear scaling.

Figures 12A, 12B:
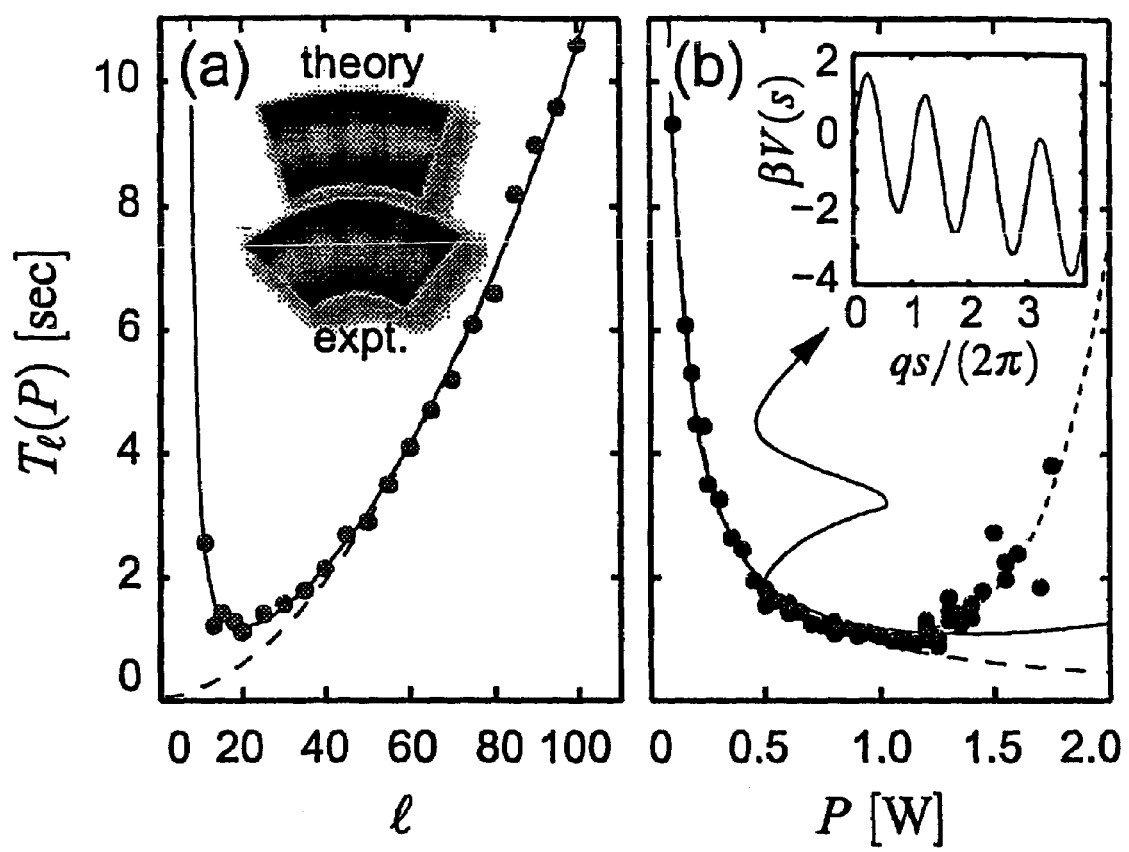
FIG. 12(a) illustrates time required for a colloidal sphere to complete one circuit of an optical vortex with the dashed curves indicate scaling predicted by Eq. (11) and the solid curves result from fits to Eqs. (20) and (21) with dependence of $T_l(P)$ on topological charge for P=500 mW and the inset illustration shows corrugated intensity distribution around one quarter of the circumference of an l=20 optical vortex measured at reduced intensity, compared with calculated pattern at l=40 at the same scale.
FIG. 12(b) shows dependence of $T_l(P)$ on applied power for l=19 with the dotted curve including the influence of a localized hot spot and the inset shows potential energy landscape calculated from fits to the data in FIG. 12(a) and FIG. 12(b) for l=19 and P=500 mW.

The radius' linear dependence on topological charge also affects the optical vortex's local angular momentum flux. The data in FIG. 12(a) show that the time $T_l(P)$ required for a trapped particle to complete one circuit scales according to Eq. (31) for larger values of l. For l<40, however, the period is systematically larger than predicted. Similarly, $T_l(P)$ scales with P as predicted for lower powers, but tends to increase as P increases.

Both of these unexpected effects can be ascribed to the detailed structure of optical vortices created with pixilated diffractive optical elements. When projected to the Σ=1.7 mm radius input aperture of the objective lens, each effective phase pixel spans roughly 10Å. Numerically transforming such an apodized beam reveals a pattern of 2 l intensity corrugations such as those shown in the inset portion of FIG. 12(a).

The optical vortex's azimuthal intensity modulation establishes a nearly sinusoidal potential through which the particle is driven by the mean local angular momentum flux. We model the intensity's dependence on arclength s around the ring as:

$$I_\ell(s) = \frac{P}{2\pi\lambda R_\ell}(1 + \alpha \cos qs), \quad (35)$$

where α is the depth of the modulation, and $q=4\pi l/R_l$ is its wavenumber. For $l>l_0\approx 4$ in our experimental system, q is approximately independent of l.

This modulated intensity exerts two tangential forces on the trapped sphere. One is due to the transferred angular momentum:

$$F_l(s) = A_0 \frac{P}{R_l}(1 + \alpha \cos qs), \quad (36)$$

where we assume a local angular momentum flux of $l\hbar$ per photon, the prefactor $A_0$ includes such geometric factors as the particle's scattering cross-section, and we have approximated $R_l \propto l$. The other is an optical gradient force due to the polarizable particle's response to gradients in the light's intensity:

$$F_g(s) = \varepsilon A_0 \frac{2\pi\lambda}{q}\frac{\partial I_l(s)}{\partial s} = \varepsilon A_0 \frac{P}{R_l}\alpha \sin qs, \quad (37)$$

where ε sets the relative strength of the gradient force. Combining Eqs. (36) and (37) yields the tangential force:

$$F(s) = A_0 \frac{P}{R_l}(1 + \eta \cos qs), \quad (38)$$

where we have dropped an irrelevant phase factor, and where $\eta=\alpha(1+\varepsilon^2)^{1/2}$. Even if the relative intensity modulation α is much smaller than unity, both ε and η can be much larger. In that case, reducing l' at fixed P increases the depth of the modulation relative to the thermal energy scale $\beta^{-1}=k_B T$, at temperature T, and the particle can become stuck in a local potential minimum. The modulated potential thus increases the effective drag.

More formally, a particle's motion along an inclined sinusoidal potential with strong viscous damping is described by the Langevin equation:

$$\gamma \frac{ds}{dt} = F(s) + \Gamma(t), \quad (39)$$

where γ is the viscous drag coefficient, Γ(t) is a zero-mean random thermal force, and F(s) is given by Eq. (38). The associated ensemble-averaged mobility μ may be expressed in the form:

$$\gamma\mu = 1 + 2Im\left\{\cfrac{\frac{1}{4}\eta^2}{\frac{l}{l_T} + i + \cfrac{\frac{1}{4}\eta^2}{2\frac{l}{l_T} + i + \ldots}}\right\}, \quad (40)$$

where $l_T=BA_0P/(4\pi)$ is the topological charge at which the modulation reaches $k_a T$. Given this result, $$T_l(P) = T_1 \frac{P_1}{P}\frac{l^3}{\mu}, \quad (41)$$

where $T_1=A_0/(2\pi\gamma R_1 P_1)$ is the expected period for l=1 at $P=P_1$ in the absence of modulation. The solid curve in FIG. 12(b) results from a fit to Eqs. (40) and (41) for $T_1, l_T$ and η. The results, $T_1 P_1/P=1$ msec, $l_T=1.7$, and $\eta=19$, are consistent with the strongly modulated potential shown in the inset to FIG. 12(b). Rather than smoothly processing around the optical vortex, the particle instead makes thermally activated hops between potential wells in a direction biased by the optical vortex's torque.

Replacing $1/l_T$ with $P_T/P$ in Eq. (40) enables us to obtain an analogous result for the period's dependence on applied power for fixed l, as shown in FIG. 12(b). Here, $P_T=4\pi l/(\beta A_0)$ is the power at which the depth of the modulation reaches $k_B T$. Using η obtained from FIG. 12(a), we find that the sphere's motions above P=1.5 W not only are slower than predicted by simple scaling, they are slower even than our model predicts. The period's divergence at high power is due to a localized "hot spot" on the l=9 optical vortex resulting from aberrations in our optical train. Such hot spots have confounded previous attempts to study single-particle dynamics in helical beams. Because hot spots' potential wells also deepen with increasing power, they retain particles with exponentially increasing residence times of the form $T(P)=T_H \exp(P/P_H)$. The data in FIG. 12(b) are consistent with $T_H=5$ msec and $P_H=270$ mW. Such localization becomes comparable to the corrugation-induced drag only for powers above P=1 W and so does not affect the data in FIG. 12(a).

Despite intensity modulations' slowing influence, the simple scaling relation, Eq. (31) is remarkably successful at describing a particle's motions around an optical vortex. This success strongly supports the contention that each photon contributes $l\hbar$ to the local angular momentum flux of a helical beam of light, and not only to the beam's overall angular momentum density. This agreement hinges on our observation that the radius of a practical optical vortex scales linearly with its topological charge, unlike an $LG_{p,l}$ mode. The corrugations in apodized optical vortices not only provide a realization of M. C. Escher's impossible staircase, but also offer unique opportunity to apply overdamped transport to tilted sinusoidal potentials for potential uses. As a practical Brownian ratchet, this system promises insights germane to such related phenomena as transport by molecular motors, voltage noise in Josephson junction arrays, and flux flow in type-II superconductors. Preliminary observations of multiple particles on an optical vortex also suggest opportunities to use transitions from jamming to cooperativity with increasing occupation with potential applications for optical vortices for driving motion in microscopic machines.

The general concepts described hereinbefore regarding certain and use of optical vortices can be illustrated by describing the radius variable for a very general class of practical optical vortices which scales linearly with the topological charge:

$$R_l = a \frac{\lambda f}{\pi \Sigma} \left(1 + \frac{l}{l_o}\right) \tag{42}$$

where $\lambda$ is the wavelength of light, f is the focal length of the lens focusing the beam into an optical trap, and $\Sigma$ is the radius of that lens' input aperture. For an optical train with no aberrations, numerical analysis reveals a=2.585 and $l_0=9.80$. This result differs qualitatively with previously published predictions, all of which claim $R_l=\sqrt{l}$. This fundamental result is the basis for the inventions described in this disclosure.

Figure 13:
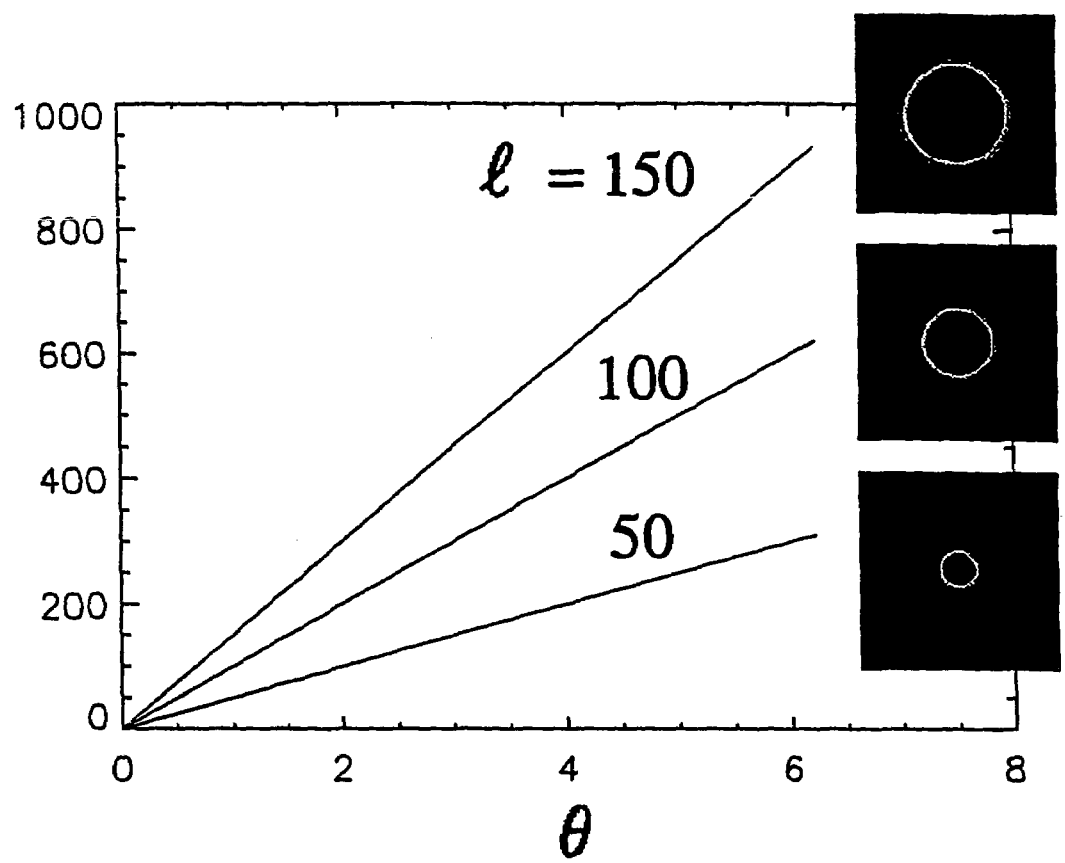
FIG. 13 illustrates the phase dependence and images of optical vortices with l'=50, 100, and 150.

Prior art implementations of optical vortices have all considered helical beams of light with constant pitch. In other words, the derivative of the phase, $d\phi(\vec{r})/d\theta \propto l$ has been selected to be independent of $\theta$. This is depicted in FIG. 13 for three different values of the (constant) topological charge l. In all three cases, the result is a perfectly circular optical vortex whose radius, therefore, is independent of $\theta$.

We generalize this result by setting $\phi(\theta)$ to be a general (and not simply linear) function of $\theta$ with the proviso that $\phi(\theta)=\phi(\theta+2\pi) \mod 2\pi$. As a result, we transform the pattern of focused light from a simple annulus to a more general profile.

$$R(\theta) = a \frac{\lambda f}{\pi \Sigma} \left(1 + \frac{1}{l_o} \frac{d\varphi}{d\theta}\right) \tag{43}$$

As a first practical demonstration of this general approach to crafting the geometry of optical traps, we consider the effects of adding a sinusoidal modulation to the otherwise linear angular dependence of an optical vortex:

$$\Phi(\theta)=l[\partial+\alpha \sin(m\theta+\beta)]\mod 2\pi \tag{44}$$

Here, $\alpha$ is the amplitude of an m-fold modulation, and $\beta$ sets its orientation. We implemented this phase modulation using a conventional dynamic holographic optical tweezer system illustrated in FIG. 10(a). FIGS. 14(a)–14(i) show images of the focused modulated optical vortices for l=60, a fixed depth of modulation $\alpha=0.1$, and modulations ranging from m=2 to m=10.

Like the regular optical vortices, the radial intensity structure of modulated vortices is related to the local slope of the phase $\phi(\theta)$. However, the slope is no longer constant as a function of angle $\theta$, $$\frac{d\phi}{d\theta} = l[1 + m\alpha \cos(m\theta + \beta)] \tag{45}$$

and this modulation is reflected in the flower-like Lissajous patterns described by the light. As predicted, the experimentally determined radius varies with angle as:

$$R_l(\theta) = a \frac{\lambda f}{\pi \Sigma} \left\{1 + \frac{l}{l_o}[1 + m\alpha \cos(m\theta + \beta)]\right\} \tag{46}$$

In particular, for a given modulation m, there are always at least m intensity lobes around the vortex whose shape and size depend on the nature of the modulation. For this sinusoidal example, the radius depends on the combination $lm\alpha$, with additional lobes appearing when the combination $m\alpha<0$, so that the modulation passes through r=0. This effect is shown for a 4-fold modulated vortex with l=60 in FIG. 15.

Extrema in $R(\theta)$ occur at angles $(\theta j)=2\pi j/m+\beta$. Therefore, patterns such as those in FIGS. 14(a)–(i) and 15(a)–(e) can be rotated continuously by varying $\beta$. The same effect can be obtained by rotating the phase mask encoding $\Phi(\theta)$ about the optical axis. This has potential applications for controllably rotating asymmetric objects illuminated by a modulated optical vortex, with the degree of rotation being controlled by the offset angle $\beta$.

The light used to create a modulated optical vortex is distributed uniformly along the pattern's arclength. Because the arclength increases most rapidly where ($\theta$) is largest, the patterns' outer extremities are less intense. This intensity modulation also can be varied through the radial dependence of $\Phi(\theta)$.

Provided that $$\int_o^{2\pi} (d\phi/d\theta) d\theta > 0$$

the modulated optical vortex still carries an orbital angular momentum that it can transfer to illuminated objects. The local force i exerted on an illuminated object no longer is constant over the extended optical trap's arclength, but rather depends in a complicated manner on details of $\Phi(\theta)$. This also has potential applications for mixing and sorting macromolecules and small particles driven by the resulting force densities.

Just as optical tweezers, conventional optical vortices, and other previously described optical trapping modalities can be created and combined with the dynamic holographic optical tweezer technique, modulated optical vortices also can be created in homogeneous and heterogeneous arrangement through use of conventional methods.

While preferred embodiments have been illustrated and described, it should be understood that changes and modifications can be made therein in accordance with one of ordinary skill in the art without departing from the invention in its broader aspects. Various features of the invention are defined in the following claims.

What is claimed is:

1. A method of manipulating mesoscopic particles, comprising the steps of:
   providing a beam of light whose wavefronts are at least approximately planar;
   focusing the beam of light with a lens with a sufficiently large numerical aperture to create a single-beam gradient-force optical trap having a transverse optical gradient component;
   using the optical trap to exert forces transverse to the optical axis of the beam of light; and
   applying that transverse force to transport the particles.

2. The method of claim 1, further comprising the step of modifying the properties of the focused beam of light with a phase modulation.

3. The method of claim 1, where the beam of light is a laser beam.

4. The method of claim 2, wherein the phase modulation is and is the position relative to the axis of the beam of light in a plane transverse to the direction of propogation.

5. The method of claim 1, wherein forces exerted by the optical trap transport mesoscopic matter.

6. The method of claim 5, wherein the mesoscopic matter comprises nanoclusters.

7. The method of claim 5, wherein the mesoscopic matter comprises collodial particles.

8. The method of claim 5, wherein the mesoscopic matter comprises biological cells.

9. A method of correcting aberrations that appear in an optical train defining an optical trapping system, comprising the steps of:
   locating an optical axis onto a monitoring device;
   establishing the geometry of the optical trapping system;
   locating the optical axis on a spatial light modulator;
   measuring the effective input aperture relative to the optical axis on the spatial light modulator;
   measuring any aberrations that appear in the optical train; and
   correcting the measured aberrations that appear in the optical train.

10. The method of claim 9, wherein the monitoring device comprises a video camera.

11. The method of claim 9, wherein the measured aberrations are corrected by realigning the optical train.

12. The method of claim 9, wherein the measured aberrations are corrected by the steps of:
   calculating a compensating phase mask; and
   combining the compensating phase mask with kinoforms encoding patterns of traps to correct the aberrations.

13. The method of claim 12, wherein the complexity of the compensating phase mask is measured to determine whether the optical train requires realignment.

14. The method of claim 9, wherein the measured aberrations are selected from the group consisting of spherical aberrations, comas, astigmatisms, field curvatures, distortions and combinations thereof.

15. The method of claim 9, wherein the aberrations are measured using a computer imaging system.

16. The method of claim 9, wherein the geometry of the optical trapping system is identified by the steps of:
   sending a kinoform to the spatial light modulator;
   encoding an array of traps; and
   imaging the resulting intensity in the focal plane.

17. The method of claim 9, wherein the geometry of the optical trapping system is identified by measuring the positions of each projected trap based upon the center of intensity for each focused spot of light.

18. The method of claim 9, wherein the optical axis is located onto the monitoring device by sending a uniform phase pattern to the spatial light modulator, causing the spatial light modulator to project an undiffracted beam onto a mirrored surface, which reflects the beam to the monitoring device, wherein the location of the beam on the monitoring device defines the location of the optical axis.

19. The method of claim 18, wherein the beam comprises a laser beam.

20. The method of claim 19, wherein the laser beam's intensity is adjusted such that an undiffracted region appears on the monitoring device without saturating the monitoring device.

* * * * *

UNITED STATES PATENT AND TRADEMARK OFFICE
CERTIFICATE OF CORRECTION

PATENT NO. : 7,109,473 B2
APPLICATION NO. : 10/659153
DATED : September 19, 2006
INVENTOR(S) : David G. Grier and Jennifer E. Curtis It is certified that error appears in the above-identified patent and that said Letters Patent is hereby corrected as shown below:

In column 9, line 32, delete "+he" and insert --the--;

In column 11, line 31, insert --efficiency-- after the word "diffraction" and before the words "of roughly 50%;"

In column 15, line 25, delete "+" after the equation "$\varphi_a(\vec{r}) = (a_0 / 2^{1/2})(6\rho^4 - 5\rho^2 + 1)$ spherical aberration;"

In column 15, line 27, insert --+-- before the equation "$a_1(3\rho^3 - 2\rho)\cos(\theta - \theta_1)$ coma;"

In column 15, line 29, insert --+-- before the quation "$a_2\rho^2 \lfloor 2\cos^2(\theta - \theta_2) - 1 \rfloor$ astigmatism;"

In column 15, line 30, insert --+-- before the equation "$(a_3 / 2^{1/2})(2\rho^2 - 1)$ field curvature;"

In column 15, line 32, insert --+-- before the equation "$a_4 \rho \cos(\theta - \theta_4)$ distortion;"

In column 18, line 4, insert --90-- after "SLM" and before "onto the beam's wavefront splits the single input;"

In column 20, line 5, insert --R-- after the word "IF" and before the words "is larger than;"

UNITED STATES PATENT AND TRADEMARK OFFICE
CERTIFICATE OF CORRECTION

PATENT NO. : 7,109,473 B2
APPLICATION NO. : 10/659153
DATED : September 19, 2006
INVENTOR(S) : David G. Grier and Jennifer E. Curtis It is certified that error appears in the above-identified patent and that said Letters Patent is hereby corrected as shown below:

In column 27, line 31, claim 4, insert -- $\varphi(\vec{r})$ and $\vec{r}$ -- after the words "modulation is" and before the words "the position relative to;"

Signed and Sealed this

Thirty-first Day of July, 2007

JON W. DUDAS
*Director of the United States Patent and Trademark Office*